US012430166B2

(12) United States Patent
Miniskar et al.

(10) Patent No.: US 12,430,166 B2
(45) Date of Patent: Sep. 30, 2025

(54) HIERARCHICAL TASK SCHEDULING FOR ACCELERATORS

(71) Applicant: UT-Battelle, LLC, Oak Ridge, TN (US)

(72) Inventors: Narasinga Rao Miniskar, Oak Ridge, TN (US); Frank Y. Liu, Oak Ridge, TN (US); Aaron R. Young, Oak Ridge, TN (US); Jeffrey S. Vetter, Oak Ridge, TN (US); Dwaipayan Chakraborty, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 795 days.

(21) Appl. No.: 17/542,022

(22) Filed: Dec. 3, 2021

(65) Prior Publication Data

US 2022/0188155 A1 Jun. 16, 2022

Related U.S. Application Data

(60) Provisional application No. 63/124,268, filed on Dec. 11, 2020.

(51) Int. Cl.
*G06F 9/48* (2006.01)
*G06F 9/50* (2006.01)

(52) U.S. Cl.
CPC .......... *G06F 9/4881* (2013.01); *G06F 9/5016* (2013.01); *G06F 9/5027* (2013.01); *G06F 2209/501* (2013.01); *G06F 2209/5017* (2013.01)

(58) Field of Classification Search
CPC ................ G06F 9/4881; G06F 9/5027; G06F 2209/5017
See application file for complete search history.

(56) References Cited

U.S. PATENT DOCUMENTS 7,321,940 B1 1/2008 Smith et al.
8,655,997 B2 2/2014 Eilam et al.
(Continued)

OTHER PUBLICATIONS

Arabnejad, et al., "List Scheduling Algorithm for Heterogeneous Systems by an Optimistic Cost Table," in IEEE Transactions on Parallel and Distributed Systems, vol. 25, No. 3, pp. 682-694 (Mar. 2014).
(Continued)

*Primary Examiner* — Lewis A Bullock, Jr.
*Assistant Examiner* — Kevin X Lu
(74) *Attorney, Agent, or Firm* — Klarquist Sparkman, LLP

(57) ABSTRACT

Apparatus and methods are disclosed for scheduling tasks in a heterogeneous computing environment. Coarse scheduling of a received task-set is performed centrally, with tasks dispatched to respective processing resources including one or more accelerators. At each accelerator, sub-tasks of a received task are identified, scheduled, and executed. Data-transfer and computation sub-tasks can be pipelined. The accelerator operates using small tiles of local data, which are transferred to or from a large shared reservoir of main memory. Sub-task scheduling can be customized to each accelerator; coarse task scheduling can work on larger tasks; both can be efficient. Simulations demonstrate large improvements in makespan and/or circuit area. Disclosed technologies are scalable and can be implemented in varying combinations of hard-wired or software modules. These technologies are widely applicable to high-performance computing, image classification, media processing, wireless coding, encryption, and other fields.

28 Claims, 14 Drawing Sheets

(56) References Cited

U.S. PATENT DOCUMENTS

| | | | |
|---|---|---|---|
| 10,387,202 | B2 | 8/2019 | Karaje et al. |
| 11,422,821 | B1* | 8/2022 | Hardage, Jr. .......... G06F 9/3856 |
| 11,868,872 | B1* | 1/2024 | Minkin .................. G11C 11/54 |
| 2018/0143975 | A1* | 5/2018 | Casal ...................... G06F 40/51 |
| 2020/0183738 | A1* | 6/2020 | Champigny .......... G06F 9/5016 |
| 2020/0257560 | A1* | 8/2020 | Wang .................... G06F 9/4887 |
| 2021/0406646 | A1* | 12/2021 | Han ...................... G06F 9/3877 |
| 2022/0058024 | A1* | 2/2022 | Fang ..................... G06F 9/3017 |
| 2022/0092408 | A1* | 3/2022 | Khaitan .................. G06F 13/28 |
| 2022/0147776 | A1* | 5/2022 | Yang ...................... G06V 10/82 |

OTHER PUBLICATIONS

Arm, "AMBA AXI and ACE Protocol Specification," available from https://developer.arm.com/documentation/ihi0022/e/, pp. 1-328 (Feb. 2013).

Arm, "AMBA AXI-Stream Protocol Specification," available from https://developer.arm.com/documentation/ihi0051/latest/, pp. 1-56 (Apr. 2021).

Arnold, et al., "Instruction Set Architecture Extensions for a Dynamic Task Scheduling Unit," 2012 IEEE Computer Society Annual Symposium on VLSI, pp. 249-254 (Aug. 2012).

Asanovic, et al., "The Rocket Chip Generator," EECS Department, University of California, Berkley Technical Report No. UCB/EECS-2016-27, pp. 1-9 (Apr. 2016).

Binkert, et al., "The gem5 Simulator," ACM SIGARCH Computer Architecture News, vol. 39, Issue 2, pp. 1-7 (May 2011).

Canon, et al., "Online Scheduling of Task Graphs on Heterogeneous Platforms," in IEEE Transactions on Parallel and Distributed Systems, vol. 31, No. 3, pp. 721-732 (Mar. 2020).

Dallou, et al., "Nexus#: A Distributed Hardware Task Manager for Task-Based Programming Models," 2015 IEEE International Parallel and Distributed Processing Symposium, pp. 1129-1138 (May 2015).

Johnston, et al., "AIWC: OpenCL-based Architecture-Independent Workload Characterization," available from https://arxiv.org/pdf/1805.04207.pdf, 11 pages (Oct. 2018).

Kaleem, et al., "Adaptive heterogeneous scheduling for integrated GPUs," 2014 23rd International Conference on Parallel Architecture and Compilation Techniques (PACT), pp. 151-162 (Aug. 2014).

Liu, et al., "Deffe: a data-efficient framework for performance characterization in domain-specific computing," CF '20: Proceedings of the 17th ACM International Conference on Computing Frontiers, pp. 182-191 (May 2020).

Ma, et al., "Hierarchical task scheduler for interleaving substacks on heterogeneous multiprocessor platforms," ASP-DAC '05: Proceedings of the 2005 Asia and South Pacific Design Automation Conference, pp. 952-955 (Jan. 2005).

Morais, et al., "Adding Tightly-Integrated Task Scheduling Acceleration to a RISC-V Multi-core Processor," available from https://core.ac.uk/download/pdf/326217828.pdf, 12 pages, also published as Morais, et al., "Adding Tightly-Integrated Task Scheduling Acceleration to a RISC-V Multi-core Processor," MICRO '52: Proceedings of the 52nd Annual IEEE/ACM International Symposium on Microarchitecture, pp. 861-872 (Oct. 2019).

Shao, et al., "Co-designing accelerators and SoC interfaces using gem5-Aladdin," 2016 49th Annual IEEE/ACM International Symposium on Microarchitecture (MICRO), 12 pages (Oct. 2016).

Shantharama, et al., "Hardware-Accelerated Platforms and Infrastructures for Network Functions: A Survey of Enabling Technologies and Research Studies," IEEEAccess, pp. 132021-132085 (Jul. 2020).

Sjalander, et al., "A Look-Ahead Task Management Unit for Embedded Multi-Core Architectures," 2008 11th EUROMICRO Conference on Digital System Design Architectures, Methods and Tools, pp. 149-157 (Sep. 2008).

Topcuoglu, et al., "Performance-effective and low-complexity task scheduling for heterogeneous computing," in IEEE Transactions on Parallel and Distributed Systems, vol. 13, No. 3, pp. 260-274 (Mar. 2002).

Vetter, et al., "Extreme Heterogeneity 2018: Productive Computational Science in the Era of Extreme Heterogeneity Report for DOE ASCR Basic Research Needs Workshop on Extreme Heterogeneity," available from https://www.osti.gov/servlets/purl/1494112, pp. 1-49 (Jan. 2018).

Waterman, et al., "RISC-V Instruction," poster available from https://old.hotchips.org/wp-content/uploads/hc_archives/hc25/HC25- posters/HC25.26.p70-RISC-V-Warterman-UCB.pdf, 1 page (2013).

Western Digital, "RISC-V and Open Source Hardware Address New Computer Requirements," available from https://documents.westerndigital.com/content/dam/doc-library/en_us/assets/public/western-digital/collateral/tech-brief/tech-brief-western-digital-risc-v.pdf, pp. 1-6 (Dec. 2019).

* cited by examiner

```
Legend: Input feature map (IH x IW x ID)  Output feature map (OH x OW x OD)
        Weights (OD x ID x KH x KW)
        Input tile (ith x itw x id)        Output tile (oth x otw x otd)

L01: (sweights, sIFmap, sKernel, sOFmap) = CreateSubTasks(Task)
L02: pipeline = new Pipeline ([sweights, sIFmap, sKernel, sOFmap])
L03: AllocateStreamDoubleBuffers(pipeline)
L04: for oh: 0 to OH step oth do
L05:   for ow: 0 to OW step otw do
L06:     for od: 0 to OD step otd do
L07:       for id: 0 to ID step itd do
L08:         ts = pipeline->GetCurrentTimestamp()
L09:         next_ts = pipeline->GetNextTimestamp()
L10:         if weightsDMAenabled:
L11:           pipeline->ConfigureDMA(next_ts, sweights, aweightsMain, aweightsLocal)
L12:         if IFmapEnabled:
L13:           pipeline->ConfigureDMA(next_ts, sIFmap, aIFmapMain, aIFmapLocal)
L14:         pipelineConfigureKernel(next_ts+1, sKernel, aweightsLocal, aIFmapLocal, aOFmapLocal)
L15:         if OFmapEnabled:
L16:           pipeline->ConfigureDMA(next_ts+2, sOFmap, aOFmapLocal, aOFmapMain)
L17:         pipeline->RunCurrentTimestampTasks()
L18:         pipeline->ConfigureNextTimeStampTasks()
L19:         pipeline->WaitForTasks()
L20:       end
L21:     end
L22:   end
L23: end
L24: pipeline->RunAllPrologTasks()
```

*FIG. 6*

HIERARCHICAL TASK SCHEDULING FOR ACCELERATORS

CROSS REFERENCE TO RELATED APPLICATION

This application claims the benefit of U.S. Provisional Application No. 63/124,268, filed Dec. 11, 2020, which is incorporated herein by reference in its entirety.

ACKNOWLEDGMENT OF GOVERNMENT SUPPORT

This invention was made with government support under Contract No. DE-AC05-00OR22725 awarded by the U.S. Department of Energy. The government has certain rights in the invention.

BACKGROUND

As technology scaling comes to a standstill, heterogeneous computing has garnered interest as a potential path to continued increases in computing performance. In a heterogeneous environment, a general purpose host processor can be coupled to one or more accelerators—which are specialized circuit modules that can perform certain compute-intensive tasks faster or more efficiently than the host processor. However, for all but the simplest applications, scheduling tasks among accelerators has proven to be a significant challenge, and accelerator resources often remained under-utilized.

On one hand, scheduling is an NP-complete problem, and an increase in numbers of tasks can exponentially increase the difficulty of finding efficient schedules. The challenge of scheduling large numbers of tasks can increase further if a heterogeneous computer is to support multiple client applications concurrently. Thus, scheduling feasibility weighs in favor of partitioning a computation job into a small number of coarse-grained tasks. On the other hand, large tasks can require larger banks of high performance memory at each accelerator in order to efficiently process the large tasks. Die sizes can become prohibitive as the number of accelerators is increased. That is, considerations of die size weigh in favor of partitioning a job into a large number of fine-grained tasks, which is at odds with scheduling. Till now, performance and scaling of heterogeneous computers have been limited by these conflicting considerations.

Accordingly, there remains a need for improved technology to schedule tasks in a heterogeneous computing environment.

SUMMARY

In brief, the disclosed technologies schedule tasks hierarchically. In examples, coarse scheduling of large tasks can be performed centrally, leading to dispatch of large tasks to individual acceleration modules. At each acceleration module, a received task can be partitioned into smaller sub-tasks, fine scheduling of these sub-tasks can be performed, and the sub-tasks can be executed locally.

In one aspect, the disclosed technologies can be implemented as a system for scheduling tasks among a plurality of accelerator circuits. The system includes a hierarchical task scheduler having a coarse scheduling circuit module and at least two fine scheduling circuit modules. The coarse scheduling circuit module is configured to receive task-set metadata; schedule tasks from the task-set metadata among the plurality of accelerator circuits, to optimize a predetermined criterion; and dispatch the scheduled tasks to the plurality of accelerator circuits. Each fine scheduling circuit module is communicatively coupled with the coarse scheduling circuit module and with corresponding one or more of the accelerator circuits. Each fine scheduling circuit module includes an interface sub-module and an accelerator-specific scheduler (AS) sub-module. The interface sub-module is configured to receive, from the coarse scheduling circuit module, the tasks scheduled for the corresponding one or more accelerator circuits. For at least a given task of the received tasks, the accelerator-specific scheduler (AS) sub-module is configured to partition a given task into one or more streams of first sub-tasks, which include at least some computation sub-tasks, and to schedule the computation sub-tasks among the corresponding one or more accelerator circuits.

In some examples, the interface sub-module can include a FIFO configured to queue the received scheduled tasks. Another portion of the first sub-tasks can include data-transfer sub-tasks. Each fine scheduling circuit module can include a respective memory controller. The AS sub-module can be configured to schedule the data-transfer sub-tasks for execution by the respective memory controller. The AS sub-module can be configured to schedule the data-transfer sub-tasks pipelined with the computation sub-tasks. The respective memory controller can be communicatively coupled with accelerator-side static random-access memory (SRAM) through a direct memory access (DMA) channel, and can be communicatively coupled with main memory through a bus shared among the two or more fine scheduling circuit modules. The first sub-tasks can include instructions to configure accelerator-specific memory-mapped addresses and DMA-specific memory-mapped addresses.

In additional examples, the predetermined criterion to be optimized by the coarse scheduling circuit module can be a makespan. The accelerator circuits can incorporate respective neural network kernels, each of the neural network kernels configured as a convolution kernel, a batch normalization kernel, or a fully-connected layer kernel. The accelerator circuits can include convolution kernels of multiple types. At least one of the fine scheduling circuit modules is implemented as a hard-wired circuit. The coarse scheduling circuit module and at least one of the fine scheduling circuit modules can be implemented on a common chip. The coarse scheduling circuit module and at least one of the fine scheduling circuit modules can include distinct respective processor cores configured to execute respective scheduling instructions.

In further examples, the system and the plurality of accelerator circuits can be implemented in a chipset. The accelerator circuits can include two or more of: a neuromorphic array, a field-programmable gate array (FPGA), a general-purpose graphics processor unit (GPGPU), or an application specific integrated circuit (ASIC). The system, the plurality of accelerator circuits, and a host processor can be incorporated into a high-performance computing (HPC) system. The host processor can be configured to provide the task-set metadata to the coarse scheduling circuit module.

In a second aspect, the disclosed technologies can be implemented as a chipset incorporating first circuitry and second circuitry. The first circuitry is configured to implement a task scheduler. The second circuitry, distinct from and coupled to the first circuitry, incorporates a processor core and is configured to implement an accelerator and a sub-task scheduler. The first circuitry is further configured to dispatch a first task to the second circuitry based on output from the task scheduler. The sub-task scheduler is further configured to schedule a plurality of sub-tasks of the first task for execution at the accelerator.

In some examples, the first circuitry can include another processor core and hard-wired circuitry implementing the task scheduler. The another processor can be coupled to the hard-wired circuitry and configured to control the task scheduler. In further examples, the processor core can be configured to implement the sub-task scheduler by executing program instructions. In other examples, the second circuitry can include hard-wired circuitry implementing the sub-task scheduler. The processor core can be coupled to the hard-wired circuitry and configured to control the sub-task scheduler.

In additional examples, the processor core can be a first processor core, the accelerator can be a first accelerator, the sub-task scheduler can be a first sub-task scheduler, and the chipset can include third circuitry, coupled to the first circuitry, implementing a second accelerator and a second processor core. The second processor core can be configured to implement a second sub-task scheduler. The first circuitry can be configured to dispatch a second task to the third circuitry based on output from the task scheduler. The second sub-task scheduler can be configured to schedule a plurality of sub-tasks of the second task on the second accelerator. In further examples, the chipset can include eight additional circuitries, each coupled to the first circuitry, each implementing a respective additional accelerator and a respective additional processor core configured to implement a respective additional sub-task scheduler. The first circuitry can be configured to dispatch respective tasks to the additional circuitries based on output from the task scheduler. Each of the additional second sub-task schedulers can be configured to schedule a plurality of sub-tasks of the respective task on the respective additional accelerator.

In certain examples, the accelerator can implement a neural network kernel, a convolution function, a matrix arithmetic function, a matrix analysis function, a data compression function, an encryption function, a domain transform, a bit blit function, a regular expression search function, a wireless coding function, or a beamforming function. The processor core can be a RISC-V processor core.

In further examples, the chipset can be incorporated in a smartphone supporting a 5G cellular network standard or a 6G cellular network standard. The chipset can be incorporated in a multimedia streaming apparatus, and the accelerator can be configured to support high-efficiency video coding (HEVC). The chipset can be incorporated in a media streaming apparatus, and the accelerator can be configured to support MP3 coding. The chipset can be incorporated in a telephony apparatus, and the accelerator can be configured to support a voice coding standard.

In a further aspect, the disclosed technologies can be implemented as a computer-implemented method. A first computer-readable description of first circuitry implementing a task scheduler is produced. A second computer-readable description of second circuitry is produced. The second circuitry is distinct from and coupled to the first circuitry. The second circuitry incorporates a processor core and implements a sub-task scheduler. The first circuitry is configured to dispatch a first task to the second circuitry based on output from the task scheduler and the sub-task scheduler is configured to schedule a plurality of sub-tasks of the first task at an accelerator. The first and second computer-readable descriptions are stored in one or more computer-readable storage media. The first and second computer-readable descriptions are usable for fabricating one or more masks or reticles for manufacturing one or more integrated circuits implementing the first circuitry and the second circuitry.

In some examples, the method includes fabricating the one or more masks or reticles using the stored first computer-readable description and the stored second computer-readable description. In additional examples, the method includes manufacturing the one or more integrated circuits using the stored first computer-readable description and the stored second computer-readable description.

The foregoing and other objects, features, and advantages of the invention will become more apparent from the following detailed description, which proceeds with reference to the accompanying figures.

BRIEF DESCRIPTION OF THE DRAWINGS

FIG. 6 is a pseudocode listing of an example fine scheduler according to the disclosed technologies.

DETAILED DESCRIPTION

Introduction

Figure 1A:
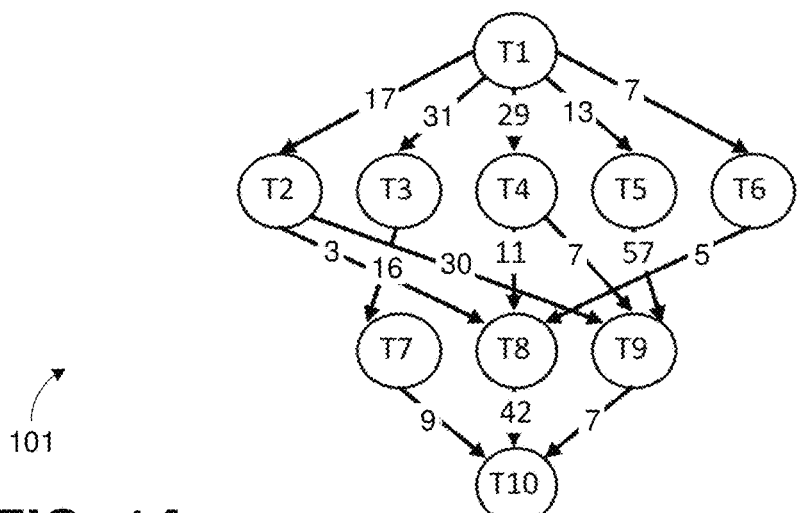
FIGS. 1A-1C are diagrams of a task scheduling example to which disclosed technologies can be applied.

Heterogeneous computers incorporate accelerators to assist general-purpose processors with a range of compute-intensive tasks, and hold promise for dramatically increasing computing power available in practical devices for a wide range of applications. However, there are conflicting considerations for how to partition a computation job into tasks.

Several considerations weigh in favor of large coarse-grain tasks. First, scheduling is NP-complete even in a homogeneous computing environment, and the time required to find a best possible schedule can scale exponentially with number of tasks. Heuristic schedulers can be used, but also suffer in schedule quality as the number of tasks increases. The problem of scheduling complexity is significantly exacerbated in a heterogeneous computing environment where processing time for a given task can vary between processing resources, and data transfer time can also vary. This problem is further exacerbated for larger scale heterogeneous computers, as an increasing number concurrent applications can be required in order to maintain high levels of utilization as the number of accelerators increases. Thus, scheduling complexity strongly weighs in favor of large coarse-grain tasks.

Another consideration strongly favoring large tasks is compatibility with programming models used for client applications. That is, developers of a client application can often readily provide a coarse-grained task graph and corresponding task parameters. Adaptation of the task parameters into a cost matrix for a particular set of heterogeneous computing resources can be a straightforward exercise. That is, large tasks provide programming portability, where accurate task-set metadata can be easily obtained for varying heterogeneous computer architectures.

Other considerations weigh in favor of small fine-grain tasks. Generally, it is desirable for an accelerator to operate on local memory because the alternative, operating the accelerator directly on main memory, can suffer from (i) high memory latency, (ii) shared access with other components, and (iii) data transfer rates limited by bus width, resulting in poor performance from a data-starved accelerator. Local memory area required for large-task acceleration can dwarf the die area required for the accelerator itself. In turn, this can constrain the scalability of the heterogeneous computer. In contrast, fine-grain tasks can be accelerated with a small footprint for high-performance local memory.

The disclosed technologies separate the partitioning and scheduling problem into two (or more) hierarchical levels. At an apex level, large coarse-grain tasks provide application portability and maintain the apex scheduling problem at a manageable scale. Thus, large tasks can be scheduled by an apex scheduler and dispatched to respective acceleration modules. Within each acceleration module, the task can be partitioned into sub-tasks, which can be scheduled (e.g. fine scheduling) on a local accelerator. Because the task and the accelerator are narrowly defined (e.g. a convolution task to be executed on a convolution kernel), the parameter spaces to be considered are also narrow, and partitioning can be straightforward. In examples, task partitioning can be achieved by dividing an iteration range into tiles. Further, with just a single accelerator present, determining an efficient fine schedule can also be straightforward. Even with several (e.g. 2-10) accelerators in an acceleration module, the fine scheduling can be much simpler than task scheduling at the apex level. In some examples, the sub-task partitioning or fine scheduling can be implemented as hard-wired circuit modules.

Whether implemented as hard-wired circuits or software, accelerators and fine schedulers can benefit from design re-use. To illustrate, a single parameterized design can be re-used for convolutional kernels with MAC counts ranging from 64 to 1024 or even more.

The hierarchical approach is well-suited to mixing types of accelerators, or even diverse accelerator technologies, in a single heterogeneous computer. The disclosed technologies scale well, both in terms of supporting large numbers of accelerators (because of the low requirements for local memory) and in terms of supporting large numbers of client applications (because of the large tasks at the apex level).

Terminology

To facilitate review of the various embodiments, the following explanations of terms are provided. Occasionally, and where clear from the context, a term may also be used in a different meaning.

1. Task Scheduling Terminology

As used herein, a "makespan" denotes an overall execution time between start and completion of a predefined computing work. Elapsed time can be measured as real time (sometimes known as "wall clock time") or processor time (sometimes known as "CPU time"). With regard to parallelization, a clock cycle in which two or more processing units perform work can be counted only once. With regard to processors working at different clock rates, a common time unit can be used. For example, 2 cycles at 100 MHz and 20 cycles at 1 GHz can each count as 20 ns.

As used herein, a "heuristic" method is a computationally practical method to solve a problem, in particular an optimization problem. To illustrate, some scheduling problems lack polynomial-time solutions (e.g. NP-Complete), and can be computationally impractical for even modest problem sizes. In such cases, heuristic scheduling can be used to obtain a "pretty good" solution in a practical amount of computation time, although superior solutions may exist, undiscovered. Predict Earliest Finish Time (PEFT) is an example of a heuristic scheduling technique. Other exemplary heuristic scheduling techniques include Heterogeneous Earliest Finish Time (HEFT) and Constrained Earliest Finish Time (CEFT).

As used herein, a "pipeline" is an arrangement of connected hardware or software functional blocks operating in parallel, such that data units flow from one functional block to the next (as if along a pipe). To illustrate, data units 1, 2, 3 can be successively fed to a pipeline of blocks A, B, C. Data unit 1 is processed first by block A (to illustrate, block A can transfer data unit 1 from main memory into local memory), the results from block A are forwarded to block B (to illustrate, block B can compute a matrix inversion on the local data), and the results from block B are forwarded to block C (to illustrate, block C can transfer the results of block B from local memory to main memory). When block C is operating on data unit 1, block B can operate on data unit 2, and block A can operate on data unit 3. The illustration with matrix inversion has a single input and a single output and is a linear pipeline, however this is not a requirement. In other examples, a pipeline can have branches. To illustrate, a convolution function can operate on input data and weights. Thus, two blocks A1, A2 can operate concurrently, respectively providing input data and weights in local memory for use by a convolution block B.

As another illustration, an LU-decomposition function can operate on one input matrix, generating two factors of the input matrix as output. Accordingly, two blocks C1, C2 can operate concurrently, respectively transferring the L and U factor matrices computed by block B from local memory to main memory.

As used herein, "schedule" and related word forms refer to temporal allocation of computing resources to each of a set of tasks or sub-tasks. To illustrate, Task A can be assigned to run on accelerator P starting at time T1, Task B can be assigned to run on accelerator Q starting at time T1, and Task C can be assigned to run on accelerator P starting at time T2. The times can be absolute times according to a particular clock, or can be relative times or time slots, such that a next time slot waits for a preceding time slot to complete before commencing. Thus, "schedule" as a verb refers to the act of temporally allocating the computing resources to the tasks or sub-tasks, "scheduler" refers to a computational module (which can be implemented as a hard-wired circuit, as software executed by a processor circuit, or as any combination thereof) configured to perform scheduling, and "schedule" as a noun refers to the output of a scheduler listing the temporal allocation of the computing resources. "Scheduling instructions" are executable program instructions performing at least a part of a scheduling act.

As used herein, "hierarchical" scheduling is with reference to an environment in which tasks are defined hierarchically, and scheduling is performed separately for the tasks at each level of the hierarchy. Without loss of generality, the hierarchy can be oriented so that lower-level tasks are sub-tasks of higher-level tasks. In some examples, the task hierarchy can have two levels, with "coarse scheduling" performed on higher level tasks and "fine scheduling" performed on lower level sub-tasks of these tasks. Extending the previous illustration with task B assigned to an acceleration module Q, task B can be partitioned into sub-tasks B1 . . . BN (for some positive integer N>1) at the acceleration module and scheduled at one or more local accelerator resources. Hierarchical scheduling is not limited to two levels. To illustrate, sub-task B1 can be assigned to accelerator Q1 within module Q, and further partitioned into third-level tasks B1a, B1b, B1c to be executed as a stream on accelerator Q1. Thus, the terms coarse and fine scheduling can be applied to any two levels of a task hierarchy.

As used herein, a "task" is a discrete unit of computing work. Non-limiting examples of tasks include a convolution operation, a matrix multiplication, a search operation, a compression operation, or an encoding or decoding operation. In some examples disclosed herein, a computation job can be organized as a set of multiple tasks dubbed a "task-set". Tasks of a task-set can have dependencies, e.g. task B can operate on the result of task A. Some tasks can be further divided into a plurality of "sub-tasks". For example, a convolution task on a large dataset can be partitioned into smaller sub-tasks each operating on a subset of the large dataset dubbed a "tile". The computing work can include "data transfers" in which data items can be moved, and "computation" in which a processor performs operations on data items. Computation operations can include, without limitation, modifying a data item (either in memory or in a register), testing a condition of a data item, or triggering an operation by a peripheral device. In some examples, a task can be partitioned into one or more computation sub-tasks (which can be executed by an accelerator) and data transfers (which can be executed by a DMA engine). A sub-task is a task.

As used herein, a "task specification" is data specifying the work to be performed, the input data for the work, and optionally the output data from the work. The work is dubbed "commands", and can be sequential program instructions, a single function name, or a designation of a custom instruction or accelerator configured to perform the specific work required. Input data can be specified as a logical variable (e.g. "Matrix-A" to match an output data "Matrix-A" from a previous task); as an absolute, relative, or relocatable memory address; or as literal data containing one or more operands for the required work; in any combination. Where present, output data can be specified as a logical variable (e.g. "Matrix-A" to match input "Matrix-A" to one or more downstream tasks or as a result from the task-set); or as an absolute, relative, or relocatable memory address. A task can be performed using a task specification, and can be performed without knowledge of associated task-set metadata.

As used herein, "task dispatch" (or simply "dispatch") refers to issuance of a task specification to an execution circuit module for execution of the task. In some examples, scheduled tasks of a task-set can be dispatched according to a task schedule. A "task dispatcher" is a circuit module (which can be hard-wired or implemented as a processor circuit executing program instructions) configured to dispatch tasks. In some examples, a task dispatcher is integrated with a task scheduler. For example, a single processor can execute program instructions for both scheduling and dispatch. A task can be dispatched in advance of its scheduled execution time and held in a FIFO until the intended execution unit is ready to process the task or scheduled to execute the task. Dispatch of sub-tasks can be similar.

As used herein, a "task-set metadata" (or simply "task metadata") is metadata specifying resources required for computation of the task-set and dependencies between the constituent tasks. The required resources can include computation time for each task of the task-set (which can vary among available processors and accelerators) and an amount of data transfer to, from, or between respective tasks. Dependencies can be provided as a task graph, with an amount of data transfer associated with each edge of the task graph. Task scheduling can be performed using the task-set metadata, and can be performed without detailed knowledge of the task specifications.

2. Integrated Circuit Terminology

As used herein, an "accelerator" is a circuit module configured to perform a computation operation in less time than the computation could be performed on a host processor executing a client application. An accelerator can have a type and a class. Two accelerators are a same "type" if they are functionally identical, and are different types otherwise. To illustrate, convolution accelerators having 128 and 1024 MAC units can be regarded as different types. Two or more accelerators can be regarded as "heterogeneous" if they include at least two accelerator types. The "class" of an accelerator indicates the underlying circuit technology or architecture with which the accelerator is implemented. Some classes of accelerators of interest herein include: an application-specific integrated circuit (ASIC), comprising hard-wired circuitry customized for certain computer operation(s); a field-programmable gate array (FPGA); a general-purpose graphics processing unit (GPGPU); or a neuromorphic array. A heterogeneous computer incorporating two or more classes of accelerators is regarded as "extremely heterogeneous".

An "accelerator-specific" memory address or register refers to a memory location or register which can be written by a host processor, scheduler, or dispatcher to configure the accelerator or which can be written by the accelerator to report status to the host processor, scheduler, or dispatcher.

As used herein, a "bus" is an electrical pathway providing a facility for data transfer between two or more circuit modules. A "shared bus" can couple three or more circuit modules. A bus can include one or more conductive paths (sometimes "wires") for data signals, control signals, or address signals. The number of conductive paths able to carry data signals concurrently can be termed the "width" of the bus.

As used herein, "direct memory access" ("DMA") refers to a facility available to a processor for transferring multiple units of data from a source circuit module to a destination circuit module, without the processor instructing the transfer of each unit of data individually. In some examples, the processor can program a controller ("DMA controller" or "DMA engine") with source and destination addresses and an amount of data to be transferred, and then trigger the transfer to commence. The DMA controller can be a peripheral device of the processor. One or both of the source and destination circuit modules can be memories. A "DMA-specific" memory address or register refers to a memory location or register which can be written by the processor to configure the DMA controller or which can be written by the DMA controller to report status to the processor.

As used herein, "electronic design automation" (EDA) refers to a set of software tools performing steps (autonomously or interactively) leading from a circuit design concept to one or more circuit design files ready for manufacture. Manufacture of a circuit on a semiconductor die can be performed using "photolithography", wherein a series of patterned operations is performed on a semiconductor surface, with the patterning defined at least in part by varying light exposure over the die. A "mask" is a device that controls the light pattern over an entire semiconductor wafer, commonly including multiple dice. A "reticle" controls the light pattern for a single die, which can be applied repeatedly for multiple dice on a wafer.

As used herein, a "hard-wired" module is implemented fully in electronic circuitry ("hardware"), wherein incoming signals are acted upon autonomously by the circuitry devices, without mediation by a processor. Hard-wired modules include integrated circuit implementations having a fixed gate design, as well as reprogrammable hardware such as an FPGA that can be configured by a bitstream, but exclude modules incorporating a processor executing a masked-ROM (read only memory) program.

As used herein, an "integrated circuit" (or "chip") is a set of one or more electronic circuit modules assembled in a single enclosed package, which can be further integrated with other integrated circuits or electrical components, e.g. on a printed circuit board. Within an integrated circuit, electronic circuitry can be provided on one or more semiconductor dice. A "chipset" is a group of one or more integrated circuits, configured to function together within an electronic apparatus. In varying examples of the disclosed technologies, accelerators or memory can be integrated on a same chip as a host processor or coarse scheduler, or can be provided on a separate chip of a chipset.

As used herein, a "kernel" is a circuit configured to perform a specific function or operation. A kernel configured to perform function X (e.g. convolution) can be dubbed an "X kernel" (e.g. "convolution kernel"). Kernel names can be further qualified, e.g. convolution-1024 kernel and convolution-128 kernel can denote convolution kernels having 1024 and 128 multiply-accumulate circuit blocks (dubbed "MACs") respectively.

As used herein, "memory" refers to one or more devices from which data can be read electronically and, often, to which data can be written electronically, e.g. by a processor or DMA engine. A variety of technologies can be used to implement memory devices. Technologies of particular interest herein include static random-access memory (SRAM), dynamic random-access memory (DRAM), and sequential access FIFOs. FIFOs can also be implemented by suitable hardware or software control logic on underlying random access memory. "Main memory" can be a large bank of memory (often multiple gigabytes) shared among multiple acceleration modules, a host processor and, optionally, other devices. Main memory can be implemented as DRAM, including. high-bandwidth memory (HBM), which is a stacked implementation of synchronous DRAM offering wide buses and high data transfer rates. "Local memory" (sometimes, "accelerator-side" memory) can be a small bank of memory (often in a range 64 bytes to 1 megabyte, but sometimes larger) not shared with any devices outside a given acceleration module. Within the acceleration module, local memory can be read or written by one or more DMA engines and one or more accelerators. Local memory can be implemented as SRAM.

As used herein, a "memory controller" is a circuit module which coordinates accesses to one or more banks of memory over one or more buses. In some examples, a memory controller can maintain a queue of scheduled DMA data transfers. In further examples, a memory controller can identify the target of a requested memory operation and forward the requested operation accordingly. To illustrate, an available memory address space can be partitioned between main memory, local memory, and memory-mapped I/O addresses; and the address of a read or write instruction can be decoded to identify a target memory device.

As used herein, a "processor" is an apparatus implemented on one or more integrated circuits and operable to decode and execute a predetermined sequence of program instructions. A "host" is a processor executing a program through which control, input, or supervision is provided to other computing hardware or software. In some examples herein, a task scheduler can receive task-set metadata from a host. A processor can include one or more execution units dubbed "cores". In a multi-core processor, cores can share one or more peripheral devices. That is, two cores of a multi-core processor can execute different programs independently of each other, subject to contention for any shared peripheral resources. Generally, the terms processor and core are used interchangeably herein, and description of a core can be applicable to a processor and vice versa. Some cores of interest herein are open-source and customizable RISC-V cores. A RISC-V core can be customized with peripheral devices including a memory controller, memory (optionally, with a wide memory bus), one or more DMA engines, a hard-wired scheduler, a hard-wired dispatcher, or one or more accelerators.

3. General Terminology

As used herein, a "buffer" is a block of data storage used for temporary storage of one or more data items. A buffer can have a single storage location or multiple storage locations for respective data items. Some buffers of interest herein are queues. A task specification can be stored in a buffer until it is dispatched.

As used herein, the term "concurrent" refers to two or more actions or processes being performed, at least in part, at a same time. For example, if process B begins not earlier than the beginning of process A, but before process A has completed, then processes A and B can be regarded as concurrent.

As used herein, a "client" is a computer hardware or software entity that uses another computer hardware or software entity, as a resource or for a service. The hardware or software entity providing the resource or service is dubbed a "server". A software application can be a client of a server, hence the term "client application". Some servers of interest herein provide accelerated computing.

As used herein, the unqualified term "data" refers to any digital representation of information.

As used herein, a "first-in first-out queue" ("FIFO queue" or simply "FIFO") is a buffer organized to retrieve data items in the same order as the data items were stored. A dispatched task can be stored in a FIFO at an accelerator device until the task is retrieved for processing (e.g. by partitioning the task into sub-tasks and executing the sub-tasks).

As used herein, a "graph" is a set of two or more vertices and a set of one or more edges joining respective pairs of the vertices. The edges can be directed (e.g. where one vertex is dependent on another vertex) or undirected. A directed edge leads from a "source vertex" to a "destination vertex". In the context of graphs, a "cycle" is a sequence of two or more directed edges forming a closed loop. A graph having directed edges but no cycles is a "directed acyclic graph" ("DAG"). Some graphs of interest herein are task graphs—a "task graph" is a DAG in which vertices represent tasks of a task-set and a directed edge from source vertex A (representing task A, an "upstream task") to destination vertex B (representing task B, a "downstream task") signifies that task B is dependent on task A. A graph can be implemented using various types of data structures (e.g. lists or arrays) storing information about vertices and edges.

As used herein, the term "module" can refer to a circuit module or a software module. A circuit module contains electronic circuitry, has one or more ports or connection points for coupling to other circuitry, and can be configured to perform one or more particular functions. A circuit module can be hard-wired, can include a processor, or can be a combination thereof. A software module contains program instructions for one or more functions and associated data. To illustrate, in some examples a scheduler can be a circuit module hard-wired to perform coarse or fine scheduling. In other examples, a scheduler can be a circuit module comprising a processor configured to execute program instructions to perform coarse or fine scheduling. In further examples, a scheduler can be a software module executed on a processor to perform coarse or fine scheduling. Memory can also be a circuit module. A module can include multiple constituent parts dubbed "sub-modules".

As used herein, the term "optimize" and related word forms refers to obtaining the best value (according to a predetermined criterion) of a predetermined parameter across a plurality of alternative scenarios. A few or many scenarios can be considered, and the best value can be determined among the considered scenarios. That is, the obtained best value need not be better than the value for other scenarios not considered. In some disclosed examples, a task schedule can be selected to optimize makespan, and the predetermined criterion can be the minimum value of the makespan.

As used herein, the term "software" refers to computer-executable programs, instructions (sometimes "program instructions"), or associated data structures. Software can be in active or quiescent states. In an active state, software can be loaded into memory, or can be undergoing execution by one or more processors. In a quiescent state, software can be stored on computer-readable media, awaiting transmission or execution.

As used herein, a "software application" is a computer-executable program perform specific functions for one or more clients or users, and can be distinct from an operating system, a software library, or a development environment. Where clear from the context, the terms "application" or "client application" refer to a software application, although "application" is also sometimes used in other meanings. Some applications of interest herein include image classification software applications.

As used herein, a "stream" is an ordered temporal sequence of data items or computation actions. Non-limiting examples of streams can include: a stream of sub-tasks, a stream of media frames, a stream of executable instructions, or a stream of data transfers to or from local memory.

4. Applications of the Disclosed Technology

All applications described in this section can generally benefit from acceleration using the disclosed technologies.

As used herein, "audio" is a digital signal representing temporally evolving sound. Audio can be represented as a stream of image frames, encoded according to an audio coding standard. Non-limiting examples of audio standards include Moving Pictures Expert Group (MPEG) Audio Layer III (MP3), Advanced Audio Coding (AAC), or Free Lossless Audio Codec (FLAC). Additional audio technologies are available for voice telephony and other speech applications, such as Code-excited linear prediction (CELP) and variants thereof, Adaptive Multi-Rate (AMR) coding, or Speex. Audio coding operations for storage, transmission, or reproduction can be compute-intensive. Audio processing can include other compute-intensive operations besides coding, such as speaker extraction, speaker identification, speech-to-text conversion, text-to-speech synthesis, and language translation.

As used herein, "encoding" refers to applying a code to input data, generally rendering it less directly intelligible. That is, extracting underlying information from encoded data can require removal of the code (e.g. by performing an inverse of the encoding operation dubbed "decoding"). "Coding" encompasses operations for encoding and/or decoding, in any combination. Coding appears in many contexts including, without limitation: representation of still images or video streams; representation of audio signals (including voice); modulation of communication signals (including wired, wireless, or optical signals); error correction of stored or transmitted data; encryption; data compression; or natural language processing.

As used herein, "high performance computing" (HPC) refers to a computer system aggregating multiple computing resources under a single operating system instance to provide one, two, or more orders of magnitude more computing power than available from any single processor core in that environment. Some examples of the disclosed technologies employ a heterogeneous mix of accelerators with hierarchical scheduling, to deliver high levels of computing power with high utilization of computing resources and low power consumption. HPC applications include modeling, optimization, machine learning, artificial intelligence, or solving equations.

As used herein, "media stream" refers to audio, video, or multimedia which is transmitted as a continuous stream of digital packets called "media frames". Multimedia refers to any combination of two or more types of media having related content—for example, audio and video streams of a television program. Multimedia can include television, webcast, conference, telephony, or other streaming content. "Media streaming apparatus" refers to equipment that can generate, distribute, record, receive, or reproduce a media stream. Media streaming apparatus can include video streaming servers; distribution or relay nodes in a content distribution network; conference bridges; video recorders, cameras, televisions; or telephones.

As used herein, a "neural network" is an artificial network of "units" (or "cells") that has linkages modeled on behavior of biological neurons and can be implemented by one or more electronic circuit modules, either hard-wired or as software executed on a processor. The units of a neural network can be organized in a graph of layers, such that output of one layer provides input to one or more other layers. A neural network can be executed as a task-set, with each task of the task set being one layer of the neural network. Numerous layer types are used in the art. Layer types of interest herein include convolution, branch normalization, and fully-connected (or dense) layers.

As used herein, a "smartphone" is a handheld mobile communication device integrating voice or video telephony with a computing environment in which software applications can be installed by a user to extend or customize functionality. Smartphones have diverse computing requirements for processing both media streams and wireless signals, and can benefit from acceleration using the disclosed technologies. Smartphones can process wireless signals under numerous standards, often grouped according to technology generation. For example, fifth-generation ("5G") standards have been deployed and sixth-generation ("6G") standards are under development.

As used herein, "video" is a digital signal representing a temporal stream of images. Often, successive images of a video stream represent successive views of a common scene, e.g. a moving picture. Video can be represented as a stream of image frames, encoded according to a video coding standard. Non-limiting examples of video standards include Advanced Video Coding (AVC, or H.264) and High Efficiency Video Coding (HEVC, or H.265). Video coding operations for storage, transmission, or reproduction can be compute-intensive. Video processing can also include other compute-intensive operations such as resizing or error-correction.

As used herein, the term "telephony apparatus" includes any equipment along a telephony signal path where voice signals are processed. Telephony apparatus can include: terminal devices such as telephones or interactive voice response (IVR) servers; exchanges operated by telecommunication service providers; customer premise equipment (CPE) such as automated call attendants or call center switchboards; or specialized equipment providing speaker identification or language translation.

Task Scheduling Example

Figure 1B:
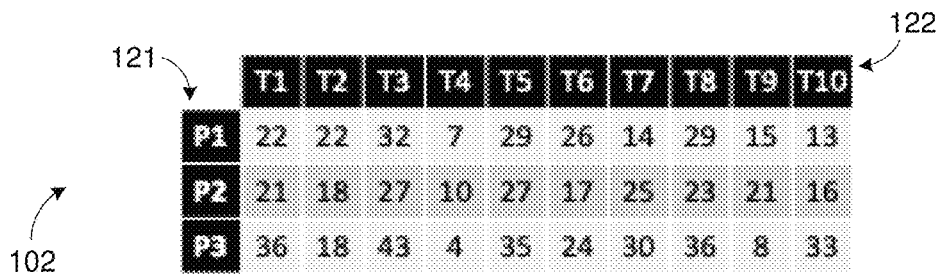
Figure 1C:
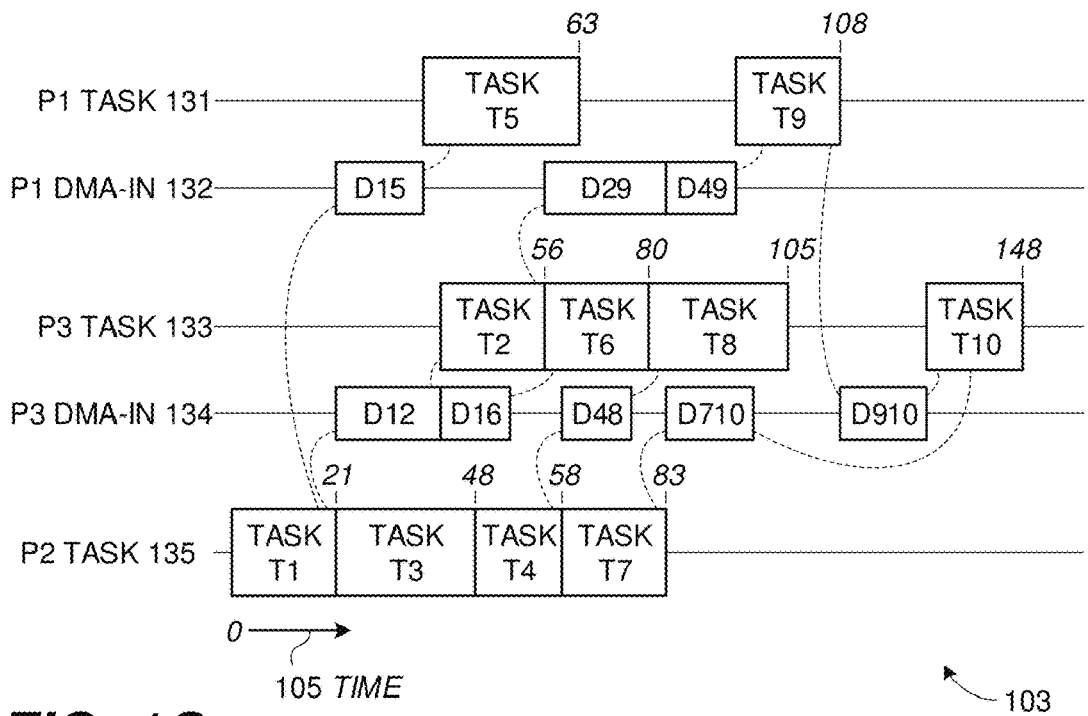

FIGS. 1A-1C are diagrams 101-103 of a task scheduling example. FIG. 1A is a task graph 101 showing dependencies of a task-set {T1, T2, . . . T10}. Each vertex of graph 101 represents one of the tasks and is depicted as a circle. Each circle is labeled with the identifier of the corresponding task. Because of the 1:1 correspondence between tasks and vertices of the task graph, labels T1 . . . T10 are used to designated vertices or tasks interchangeably.

Directed edges couple respective pairs of vertices and represent a dependency between the corresponding tasks. To illustrate, the edge from vertex T1 to vertex T2 indicates that task T2 is dependent on task T1. For example, some input data of task T2 can be generated by task T1. The edges from vertex T1 to vertices {T2, T3, T4, T5, T6} indicate that each of tasks {T2 . . . T6} is dependent on task T1. The edges from vertices {T2, T4, T6} to vertex T8 indicates that task T8 is dependent on each of tasks {T2, T4, T6}. Each edge in diagram 101 has a weight shown as a number overlaying the corresponding graph edge. These edge weights represent a cost of data transfer from one task to another if they are executed on different processing resources. (In this illustration, the data-transfer cost is regarded as zero if the tasks execute on the same processing resource.) The cost can be proportional to an amount of data to be transferred or to a time required to transfer said data. To illustrate, the weight 17 on edge T1→T2 can indicate that 17 cycles are required to transfer data generated by task T1 (and required by task T2) to a processing resource scheduled to execute task T2. In this illustration, the available processing resources can share a common data bus, as a result of which the data-transfer cost is independent of the specific distinct processing resources executing tasks T1, T2.

As illustrated, task graph 101 is a directed acyclic graph (DAG) having a single top-level vertex T1 (top-level vertices corresponding to top-level tasks which have no dependencies on other tasks) and a single leaf vertex T10 (leaf vertices corresponding to leaf tasks upon which no other tasks are dependent). In other examples, a task graph can have 2, 3, or more top-level vertices, or 2, 3, or more leaf vertices. As a matter of convention, task graph 101 shows each task exactly once. In some examples, a task-set can require a same function to be performed repeatedly with different input data. Because a task specification is a combination of commands (e.g. the repeated function) and input data, each iteration of the repeated function can be regarded as a separate task. In further examples, a task having no input data (e.g. a task incorporating a random number generator) can be repeated. As a matter of convention, each repetition of such a task can also be regarded as a separate task.

FIG. 1B is a cost matrix 102 showing execution time of each task 122 on each of processor resources 121. For example, task T4 can be executed in 7 cycles on resource P1, 10 cycles on resource P2, or 4 cycles on resource P3. Resources P1-P3 121 can be accelerators or general purpose processors, in any combination. The varying logic or execution units available at each resource P1-P3 121 can result in a given resource being more efficient for certain tasks, and less efficient for other tasks. To illustrate, resource P1 is the most efficient processing resource for task T7 or T10 and is the least efficient processing resource for task T2 or T6. Similarly, resource P2 is the most efficient for task T1 or T6 and is the least efficient for task T4 or T9; while resource P3 is the most efficient for task T4 or T9 and is the least efficient for task T5 or T8. Resources P1-P3 can be accelerators of different types or different classes.

FIG. 1C is a Gantt chart 103 showing a scheduling of tasks T1-T10 on processing resources P1-P3 121. The illustrated schedule was obtained heuristically; better schedules may exist. Arrow 105 indicates increasing time. Rows 113, 133, 135 show the tasks scheduled to run on resources P1, P3, P2 respectively. Each resource is assumed to have a single inward DMA facility which can receive data from either of the other processing resources. Rows 132, 134 show the DMA transfers to resources P1, P3 respectively. The heuristic schedule illustrated in Gantt chart 103 requires no data transfer to resource P2 and, accordingly, inward DMA for resource P2 is omitted from chart 103. The DMA transfers are labeled according to the source and destination tasks. To illustrate, data transfer D12 represents the data transferred from task T1 to task T2, and data transfer D910 represents the data transferred from task D9 to task T10. No data transfer is shown from task T8 to task T10, because these tasks are scheduled to run on the same resource P3, and no physical transfer of data is required. Dashed lines generally show the connectivity from source task (e.g. T4) to DMA data transfer (e.g. D48) to destination task (e.g. T8) in a direction of increasing time. To maintain clarity of chart 103, a few dashed lines are omitted.

Chart 103 also shows end times of each task in italics. Task T1 starts at time 0. To illustrate, task T1 on resource P2 takes 21 cycles to complete (see cost matrix 102). Data transfer D12 takes 17 cycles to complete. Task T2 can execute on resource P3 immediately upon completion of data transfer D12, taking another 18 cycles, so that task T2 completes at 21+17+18=56, as shown. Similarly, tasks T1, T3, T4, T7 can complete on processor P2 in 21+27+10+ 25=83 cycles, as shown.

Heterogeneous System with Conventional Scheduling

Figure 2:
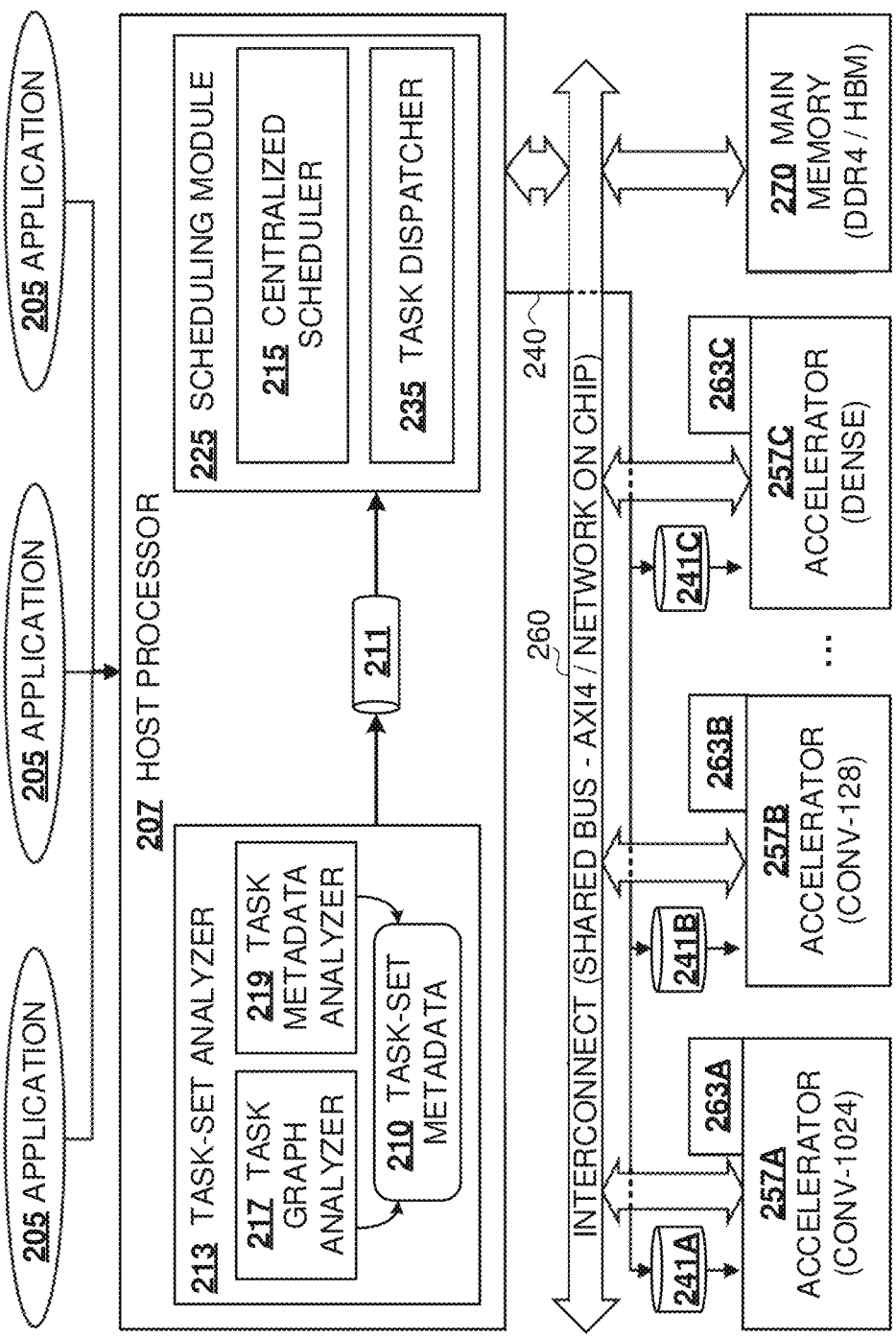
FIG. 2 is a block diagram of a system implementing prior art scheduling for a heterogeneous set of accelerators.

FIG. 2 is a block diagram 200 of a system having a heterogeneous set of accelerators and implementing a conventional approach to scheduling. In this system, a host processor 207 receives computation jobs from one or more client applications 205, and schedules and distributes tasks from the jobs for execution among multiple accelerators 257A-257C.

Host processor 207 can implement a run-time framework comprising task-set analyzer 213 coupled by FIFO 211 to scheduling module 225. Within task-set analyzer 213, task graph analyzer 217 can extract tasks and dependencies as a task graph from a received job. Output of task graph analyzer 215 can be similar to task graph 101 of FIG. 1. Task metadata analyzer 219 can determine data transfer costs along directed edges of the task graph and a cost matrix for processing the tasks of the task graph on the available processing resources, such as accelerators 257A-257C. Together, task graph analyzer 217 and task metadata analyzer 219 can determine task-set metadata 210 for a received job. Task-set metadata 210 for successive jobs can be queued in FIFO 211 pending scheduling and dispatch by scheduling module 225.

Scheduling module 225 can retrieve task-set metadata 210 from FIFO 211. Within scheduling module 225, centralized scheduler 215 can determine a task schedule (containing information similar to Gantt chart 103) and task dispatcher 235 can dispatch the tasks for execution according to the task schedule.

In the illustrated example, two channels are provided for communication between host processor 207 and accelerators 257A-257C. Task bus 240 conveys task commands and configuration data from host processor 207 to accelerators 257A-257C, while shared bus 260 conveys task input data and task output data between host processor 207, main memory 270, and accelerators 257A-257C. Dispatched tasks can be queued in FIFOs 241A-241C until respective accelerators 257A-257C are ready to perform the tasks. For each task, DMA engines 263A-263C can load input data from main memory 270 to local memory. When input data is available, a given accelerator 257A can execute its task, following which output data from the task can be transferred to main memory by DMA engine 263A. The other accelerators 257B-257C can operate similarly. In the illustrated example, accelerators 257A-257B implement convolution kernels having 1024 and 128 MAC units respectively. Accelerator 257C implements a neural network kernel for a dense layer.

First Example System

Figure 3:
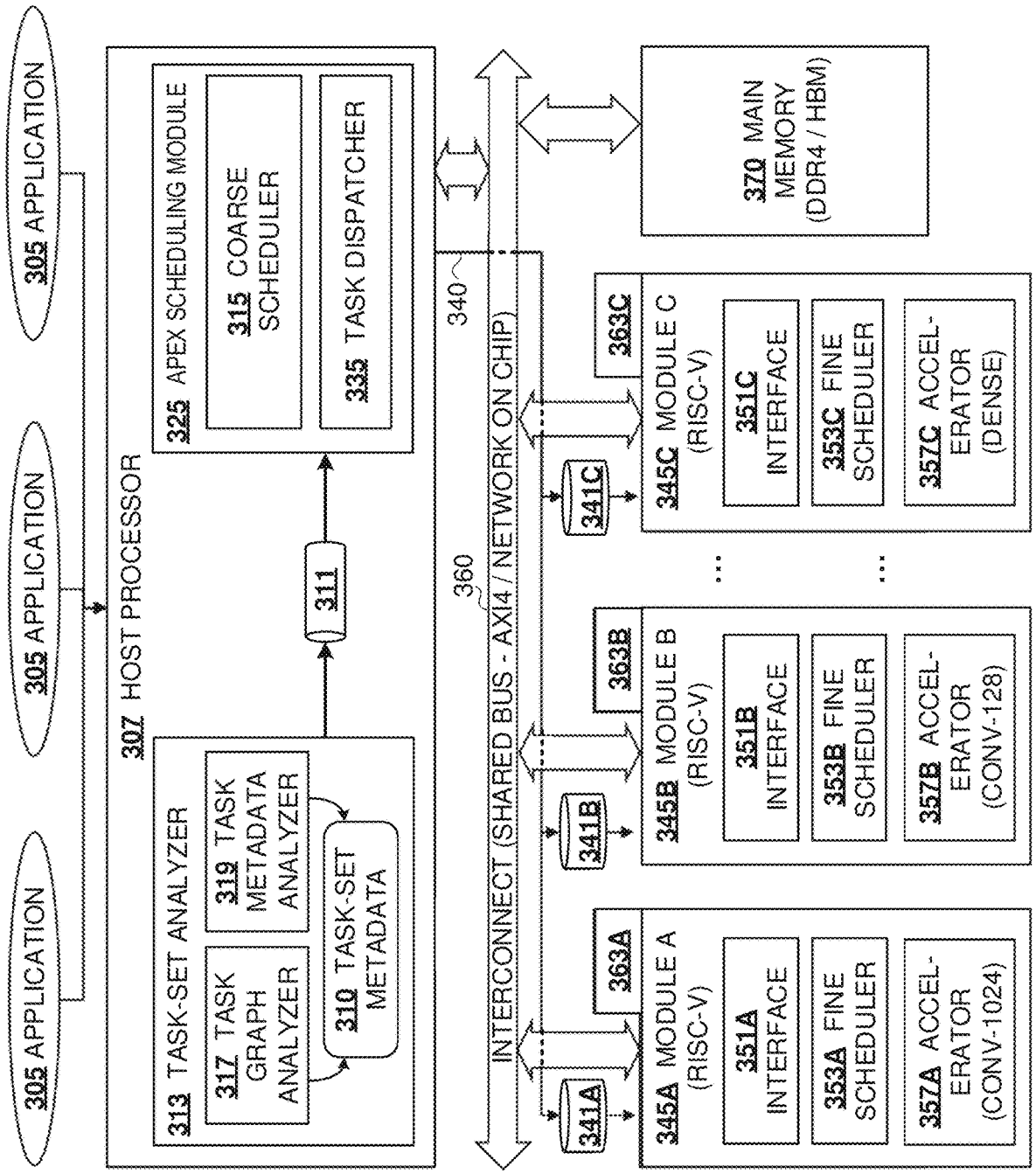
FIG. 3 is a block diagram of a first example system implementing hierarchical scheduling according to the disclosed technologies.

FIG. 3 is a block diagram 300 of a first example system implementing hierarchical for heterogeneous accelerators. In this system, a host processor 307 receives computation jobs from one or more client applications 305, and schedules and distributes tasks from the jobs among multiple accelerators 357A-357C, for execution.

Host processor 307 can implement a run-time framework comprising task-set analyzer 313 coupled by FIFO 311 to apex scheduling module 325. Within task-set analyzer 313, task graph analyzer 317 can extract tasks and dependencies as a task graph from a received job. Output of task graph analyzer 315 can be similar to task graph 101 of FIG. 1. Task metadata analyzer 319 can determine data transfer costs along directed edges of the task graph and a cost matrix similar to 102. In varying examples, task graph analyzer and task metadata analyzer can use profiling, code inspection, or past history, in any combination to determine the task graph and associated metadata, which together form determine task-set metadata 310. Task-set metadata 310 for successive jobs can be queued in FIFO 311 for retrieval by apex scheduling module 325. Within scheduling module 325, centralized scheduler 315 can determine a task schedule (containing information similar to Gantt chart 103) and task dispatcher 335 can dispatch the tasks for execution according to the task schedule.

In the illustrated example, two channels are provided for communication between host processor 307 and accelerators 357A-357C. Task bus 340 conveys task commands and configuration data from host processor 307 to acceleration modules 345A-345C, while shared bus 360 conveys task input data and task output data between host processor 307, main memory 370, and acceleration modules 345A-345C. Dispatched tasks can be queued in FIFOs 341A-341C until respective acceleration modules 357A-357C are ready to act on the tasks.

Each acceleration module 345A-345C can be based on a local processor such as a customized RISC-V processor core. Respective accelerators 357A-357C can be implemented as custom peripherals to the RISC-V core. Although modules 345A-345C are illustrated having a single accelerator 357A-357C each, this is not a requirement, and a single RISC-V core can have multiple accelerator peripherals attached. Within each acceleration module 345A-345C a respective fine scheduler sub-module 353A-353C can be configured to partition a received task into sub-tasks and schedule the sub-tasks on respective accelerator 357A-357C. In the illustrated example, accelerators 357A-357B implement convolution kernels having 1024 and 128 MAC units respectively, while accelerator 357C implements a neural network kernel for a dense layer.

Each acceleration module 345A-345C can also include a respective interface sub-module 351A-351C. Interface sub-module 351A can coordinate data transfers among various data paths between host processor 307, main memory 370, fine scheduler 353A, accelerator 357A, and other acceleration modules 345B-345C. Interface sub-module 351A can also coordinate streaming between inbound data-transfer sub-tasks and outbound data-transfer sub-tasks in lockstep.

For each sub-task, DMA engines 363A-363C can load input data from main memory 370 to local memory, and can transfer output data from local memory to main memory 370.

Because sub-tasks can be streamed or pipelined, the local memory requirement at each accelerator 357A-357C can be reduced by one, two, or more orders of magnitude. Comparing the architectures of FIG. 2-3 from a chip design perspective, the memory savings can far outweigh the die area required by a RISC-V core 345A with interface 351A and fine scheduler 353A. Further details of acceleration modules 345A-345C are described herein, for example in context of FIGS. 4-8.

Example Acceleration Module

Figure 4:
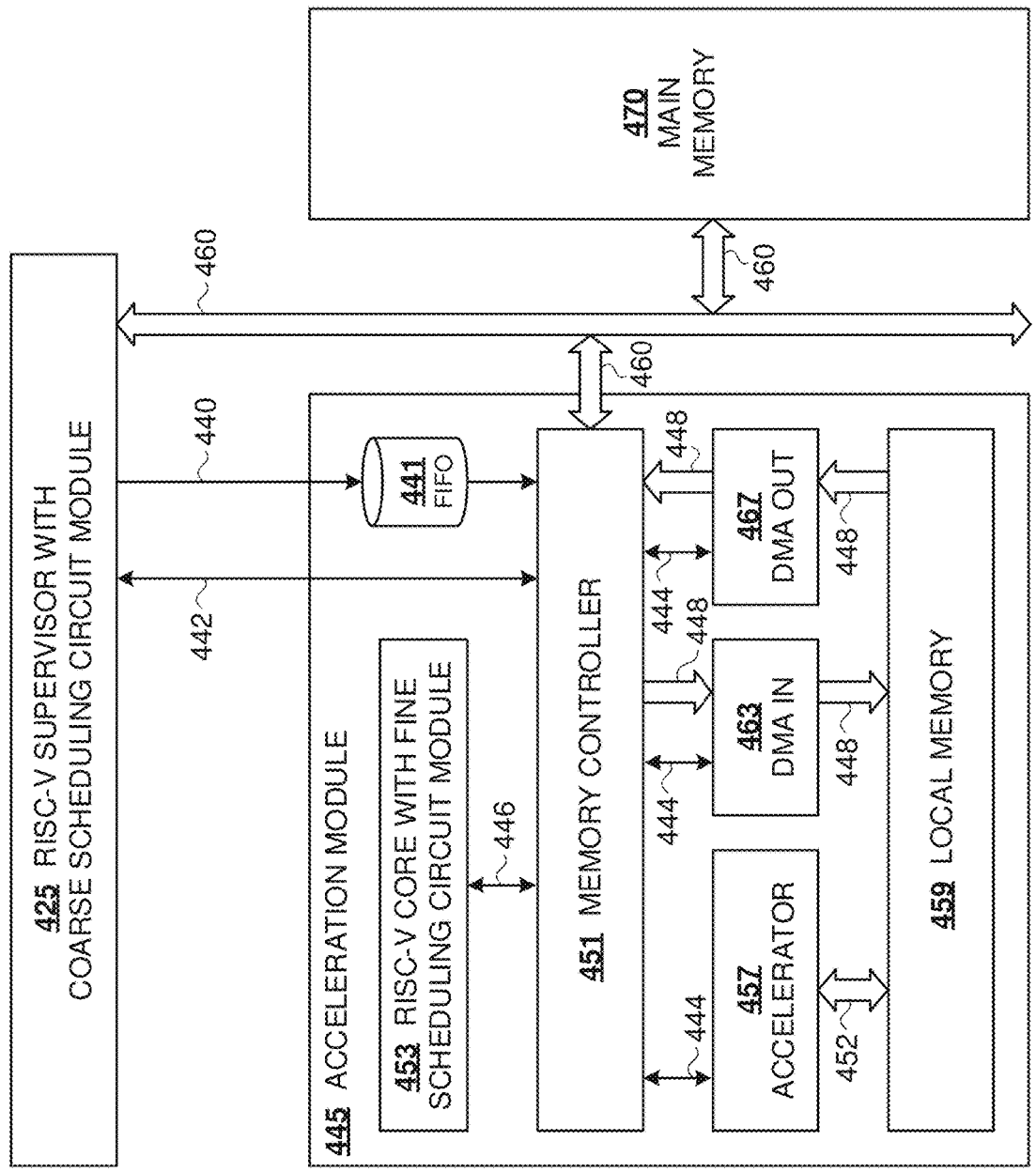
FIG. 4 is a block diagram of an example acceleration module and its environment, according to the disclosed technologies.

FIG. 4 is a block diagram 400 of an example acceleration module, its environment, and associated data paths. Although FIG. 4 shows a single acceleration module 445 having a single accelerator 457, examples of the disclosed technology can include multiple acceleration modules 445; or a single acceleration module 445 can include multiple accelerators 457 or additional DMA engines.

Acceleration module 445 can be coupled to supervisor 425 and main memory 470 through shared data bus 460, control data path 440, and FIFO 441—which can be similar to shared data bus 360, data path 340, and FIFO 341A described in context of FIG. 3. In examples, bus 460 can conform to an Advanced eXtensible Interface (AXI) bus protocol. FIG. 4 also includes a bidirectional control data path 442, which can be used by supervisor 425 to control or monitor acceleration module 445. Supervisor 425 can enable, disable, or configure components within acceleration module 445 using bus 442. For example, supervisor 425 can put accelerator 457 in a low-power state to reduce power consumption, or can adjust clock speeds on bus 460 to balance efficiency, bus utilization, and power consumption. Supervisor 425 can also trigger operation of fine scheduler 453, reset FIFO 441, or monitor completion status of tasks or sub-tasks being executed on acceleration module 457. The coarse scheduling functions of supervisor 425 can be generally similar to the functions described herein in context of apex scheduling module 325 or supervisory module 725 and their constituent components.

Memory controller 451 can coordinate data transfers and configure memory-mapped I/O over control buses 444. Memory controller 451 can also provide task specifications to fine scheduling circuit module 453 over bus 446. Computation sub-tasks can be dispatched from fine scheduling circuit module 453 to accelerator 457 via buses 446, 444. Memory controller 451 can receive data-transfer sub-tasks from fine scheduling circuit module 453 via bus 446, and can use buses 444 to configure memory-mapped I/O registers of DMA engines 463, 467 and trigger DMA data transfer operations. Buses 448 provide data paths between memory controller 451 and local memory 459, and bus 452 provides a data path between accelerator 457 and local memory 459. Bus 452 can be a very wide bus. To illustrate, a convolutional accelerator with 128 MAC units operating on 16-bit wide data can require two 16-bit operands (a weight and an input data value) at each clock cycle. Accordingly, bus 452 can be implemented as a 4096-bit wide bus to avoid data starvation at accelerator 457. Alternatively, bus 452 can be a 1024-bit wide bus clocked at quad data rate.

Example Sub-Task Execution Pipeline

Figure 5:
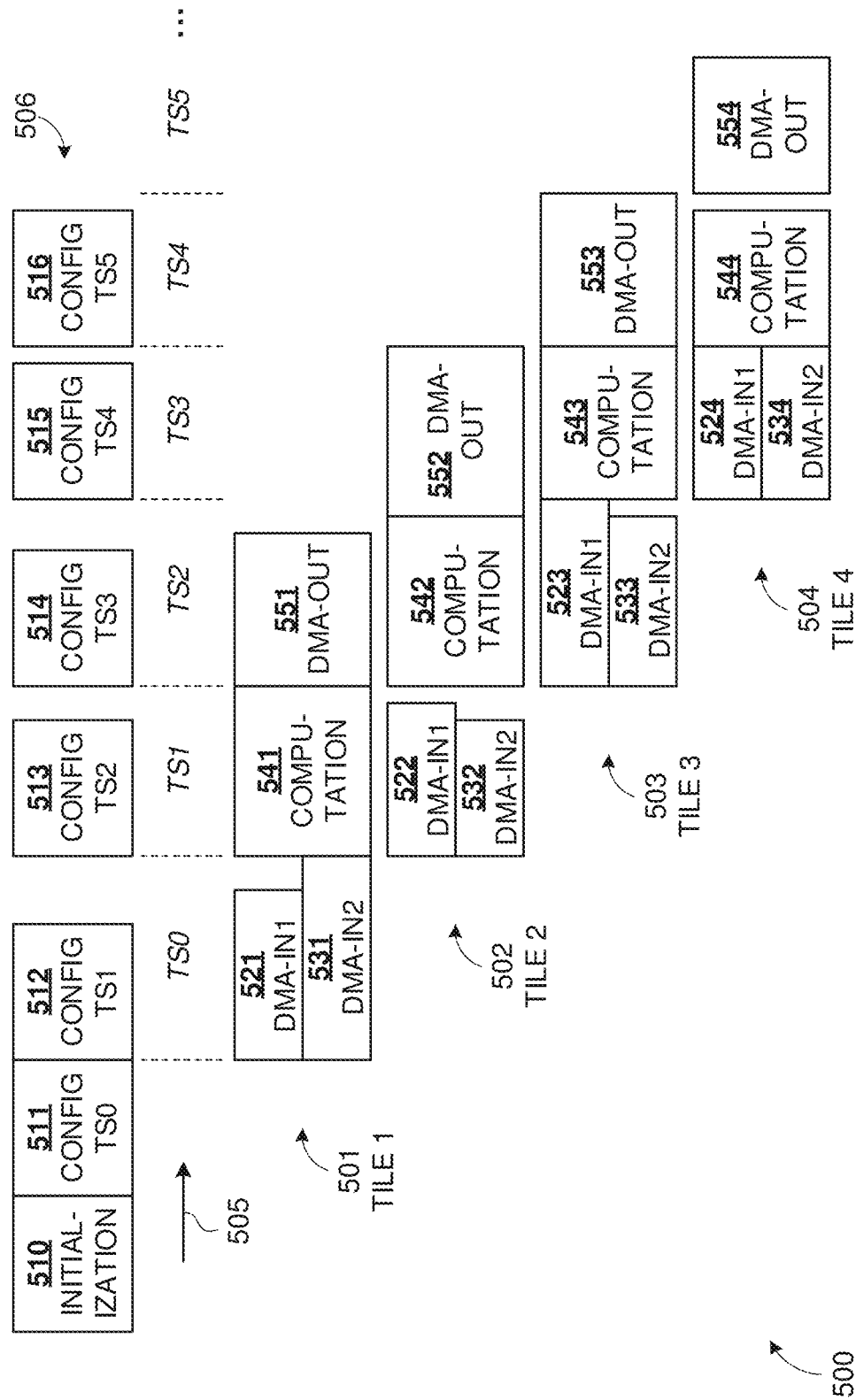
FIG. 5 is a diagram illustrating pipelined sub-task execution according to an example of the disclosed technologies.

FIG. 5 is a diagram 500 pipelined sub-task execution, with time increasing from left to right as shown by arrow 505. Six time slots TS0 ... TS5 are marked. As time progresses, sub-task execution activities are shown in five lanes 501-504 and 506. As illustrated, an instant task has been partitioned into a succession of tiles. Each tile has two inbound data-transfer sub-tasks, a computation sub-task, and an outbound data-transfer sub-task. Accordingly, lanes 501-504 depict the time ordering of sub-tasks for tiles 1-4 respectively. Lane 506 depicts a stream of configuration actions 510-516. Sub-tasks occurring in time slot K can be configured in an earlier time slot (K−1).

Initialization actions at block 510 can include reading memory-mapped I/O registers. To illustrate, block 510 can read memory-mapped registers to determine starting addresses for an inbound data-transfer stream in main memory and local memory, an amount of data to be transferred, and a stride from one tile to the next. At block 510, various configuration registers can be set or reset. To illustrate, a tile counter can be reset, or the organization of a 1024 MAC unit array can be set to 32×32, 8×8×8 (with the other 512 MAC units remaining unused), or another organization, to match the instant tiling of sub-tasks.

Subsequently, configuration blocks 511-515 can set configuration registers for sub-tasks occurring in a next time slice. For example, block 511 can set memory-mapped I/O registers for inbound DMA sub-tasks 521, 531, which are the only sub-tasks scheduled for time slot TS0. Configuration block 512 can configure registers for inbound DMA sub-tasks 522, 532 and also configure accelerator registers for computation sub-task 541, all of which are scheduled for time slot TS1. Subsequent configuration blocks 513-516 operate similarly, and can also configure memory-mapped I/O registers for outbound DMA sub-tasks 551-554. Configuration for a subsequent time slot can occur while sub-tasks of a current time slot are still executing. Accordingly, the various configuration registers can be buffered to prevent overwriting registers that are in use.

Turning to lane 501 for Tile 1, two inbound data-transfer sub-tasks 521, 531 are shown occurring at time slot TS0. For example, sub-task 521 can load a tile of an input data array and sub-task 531 can load a tile of an input weights array. At the following time slot TS1, the data tile and the weights tile can be operated on by the accelerator kernel as shown by computation sub-task 541. For example, sub-task 541 can perform convolution of the input data tile with the weights tile. Then, at time slot TS2, an outbound data-transfer sub-task 551 can move output of sub-task 541 from local memory to main memory, freeing up local memory space for subsequent tiles. The sub-tasks 521, 531, 541, 551 form a pipeline, as computation sub-task 541 operates on data from preceding stages 521, 531 and outbound data-transfer sub-task 551 operates on data from preceding stage 541.

The sub-tasks of FIG. 5 can also be viewed as streams. Sub-tasks 521-524 form a stream of inbound data-transfer sub-tasks (e.g. for tiles of an input data array), and sub-tasks 531-534 form a second stream of inbound data-transfer sub-tasks (e.g. for tiles of a weights array). Sub-tasks 541-544 form a stream of computation sub-tasks, and sub-tasks 551-554 form a stream of outbound data-transfer sub-tasks. Within each stream, going diagonally in FIG. 5, the respective sub-tasks can be executed sequentially in successive time slots.

FIG. 5 illustrates the substantial memory saving achievable with the disclosed technologies. In a conventional approach, as illustrated in FIG. 2, an accelerator can require local memory capacity sufficient to contain all input data and output data of a given task. With the present approach, a task can be partitioned into a large number of tiles (from 100 to 10,000,000 or more) and local memory only needs to have at most twice the amount of data storage required by a single tile computation sub-task. Accordingly, die area for local storage can be reduced by multiple orders of magnitude as compared to the conventional approach.

In some instances, sub-tasks executing in a given time slot can take the same time to complete, however this is not a requirement and, in general, concurrent sub-tasks can take different amounts of time to complete. Some example cases are depicted in FIG. 5. In time slot TS0, the two inbound DMA transfers 521, 531 take different amounts of time, and time slot TS0 ends when the last sub-task 531 completes. In time slot TS1, the data transfers 522, 532 complete before computation sub-task 541, and time slot TS1 ends when sub-task 541 completes. Time slot TS2 ends when inbound DMA sub-task 523 completes. However, for time slot TS3, outbound DMA sub-task 552 can get a head start. The preconditions for sub-task 552 are that computation for tile 2 is complete and the DMA output channel is free. These preconditions are met when computation sub-task 542 finishes, because DMA output sub-task 551 has finished earlier, and sub-task 552 can start before inbound DMA sub-task 523 has finished. All sub-tasks of time slot TS3 complete at the same time, and sub-tasks 553, 544 begin immediately thereafter. Time slot TS4 ends when outbound DMA sub-task 553 ends. Outbound DMA sub-task cannot get a head start because the outbound DMA channel is busy until sub-task 553 completes.

Example Fine Scheduler

FIG. 6 is a pseudocode listing 610 of an example fine scheduler for a three-dimensional (3-D) convolution task. As shown in legend 620, an input feature map is organized as an IH×IW×ID data array, which can be regarded as an ID deep stack of 2-D IH×IW array slices, IH, IW, ID representing size of the input feature map in the height (H), width (W), and depth (D) dimensions. Similarly, an output feature map is organized as an OH×OW×OD data array, which can be regarded as an OD deep stack of 2-D OH×OW slices. In this example, weights are organized as a 4-D data array of size OD×ID×KH×KW, which can be regarded as a 2-D KH×KW weight array for each pair of input and output array slices. This organization of input features, output features, and weights is exemplary and, in other applications, different organization can be used. As described herein, the fine scheduler can partition the task into sub-tasks for respective tiles of the feature maps and respective slices of the weights array. The input tiles can be organized as 3-D arrays of size ith×itw×itd and the output tiles can be organized as 3-D arrays of size oth×otw×otd. All variables in legend 620 are positive integers.

At line L01, an instant convolution task can be partitioned into sub-tasks for respective tiles. Efficiency of different tile organizations can vary based on considerations of input reuse, weights reuse, or output reuse. The tile organization can be provided as a hint from a coarse scheduler (e.g. indicating, for an accelerator with 1024 MAC units, that 32×32×1 tiles are more efficient than 16×16×4 tiles) or can be autonomously determined by the fine scheduler. For example, a fine scheduler can be preconfigured to prefer a particular tile organization for a particular dimensional organization of inputs, outputs, and weights, subject to override from the coarse scheduler. Also at line L01, data structures can be allocated and initialized for respective streams of sub-tasks: sWeights and sIFmap are sub-task streams for inbound data-transfer sub-tasks similar to 521, 531 of FIG. 5; sKernel is a sub-task stream for kernel computation sub-tasks similar to 541; and sOFmap is a sub-task stream for outbound data-transfer sub-tasks similar to 551.

At line L02, the streams can be organized as a pipeline and, at line L03, pipeline buffers can be allocated to avoid configuration delays at each time slot. Lines L04-L07 begin nested loops over output array height (indexed by oh, with stride equal to tile height oth), output array width (indexed by ow, with stride equal to tile width otw), output array depth (indexed by od, with stride equal to tile depth otd) and, in the innermost loop, input array depth (indexed by id, with stride equal to tile depth itd). In other examples, additional nested loops can traverse input array height IH and input array width IW, however in the present illustration each sub-task is presumed to span the entire range IH×IW and additional nested loops are not required.

Within the innermost loop, sub-tasks for an instant tile can be configured and added to respective data structures at lines L10-L16. The sub-tasks can be allocated to next time slot next_ts (e.g. for inbound DMA), next_ts+1 (e.g. for computation), and next_ts+2 (e.g. for outbound DMA). Time slot next_ts can be determined based on a current time slot is at lines L08-L09.

Index dependencies of the variables and array sizes within the innermost loop have been omitted for compactness of illustration. At line L11, an inbound DMA sub-task can be configured to transfer a tile of weights data from a main memory block starting at address aWeightsMain to a local memory block starting at address aWeightsLocal. This sub-task can be similar to sub-task 531 of FIG. 5 and can be added to stream sWeights and designated for execution at time slot next_ts. At line L13, and inbound DMA sub-task can be configured to transfer a tile of input feature data from a main memory block starting at address aIFmapMain to a local memory block starting at address aIFmapLocal. This sub-task can be similar to sub-task 521 and can be added to stream sIFmap and designated for execution at time slot next_ts. At line L14, a computation sub-task similar to 541 can be configured and added to stream sKernel, designated for a subsequent time slot next_ts+1. This sub-task can be configured to operate on input data at local address blocks starting at aWeightsLocal, aIFmapLocal and store output data at local address block starting at aOFmapLocal. Further, at line L16, an outbound DMA sub-task (similar to 551) can be configured to transfer a tile of output data from a local memory block starting at address aOFmapLocal to main memory address starting at address aOFmapMain.

The DMA sub-tasks can be conditioned on checking an enable variable as shown at lines L10, L12, L15. With regard to input data or input weights, a DMA sub-task can be omitted if the required data is already present in local memory and can be reused. The instant example uses a 4-D weights array, with different weight data elements for each input slice id. However, in other examples, a 2-D weights array KH×KW can be used and the weights array can be loaded just once into local memory, and reused thereafter. In further examples, nested loops can be organized with input data index id varying in an outer loop, as a result of which the same input data can be reused as output data indexes are varied in inner loops. With regard to output data, a DMA sub-task can be omitted if the output data is collected across multiple inner loop iterations. As illustrated, the target output data tile remains unchanged as inner loop index id varies, and data can be accumulated at the local memory block starting at address aOFmapLocal over the innermost loop. Thus, the outbound DMA sub-task need only be performed when index od updates.

Lines L17-L19 control pipelined execution of the configured sub-tasks. With reference to time slot TS2 of FIG. 5, at line L17 the sub-tasks previously configured for the current time slot is can be executed, e.g. inbound DMA sub-tasks 523, 533 for tile 3, computation sub-task 542 for tile 2, and outbound DMA sub-task 551. At line L18, configuration for time slot TS3=next_ts can be performed, similar to block 514. Lines 17-18 can be non-blocking. However, at line L19, the fine scheduler can block (wait) till sub-tasks of the current time slot complete, before proceeding to a next iteration within the nested loops L04-L23. Closing operations are performed at line L24.

Second and Third Example Systems

Figure 7:
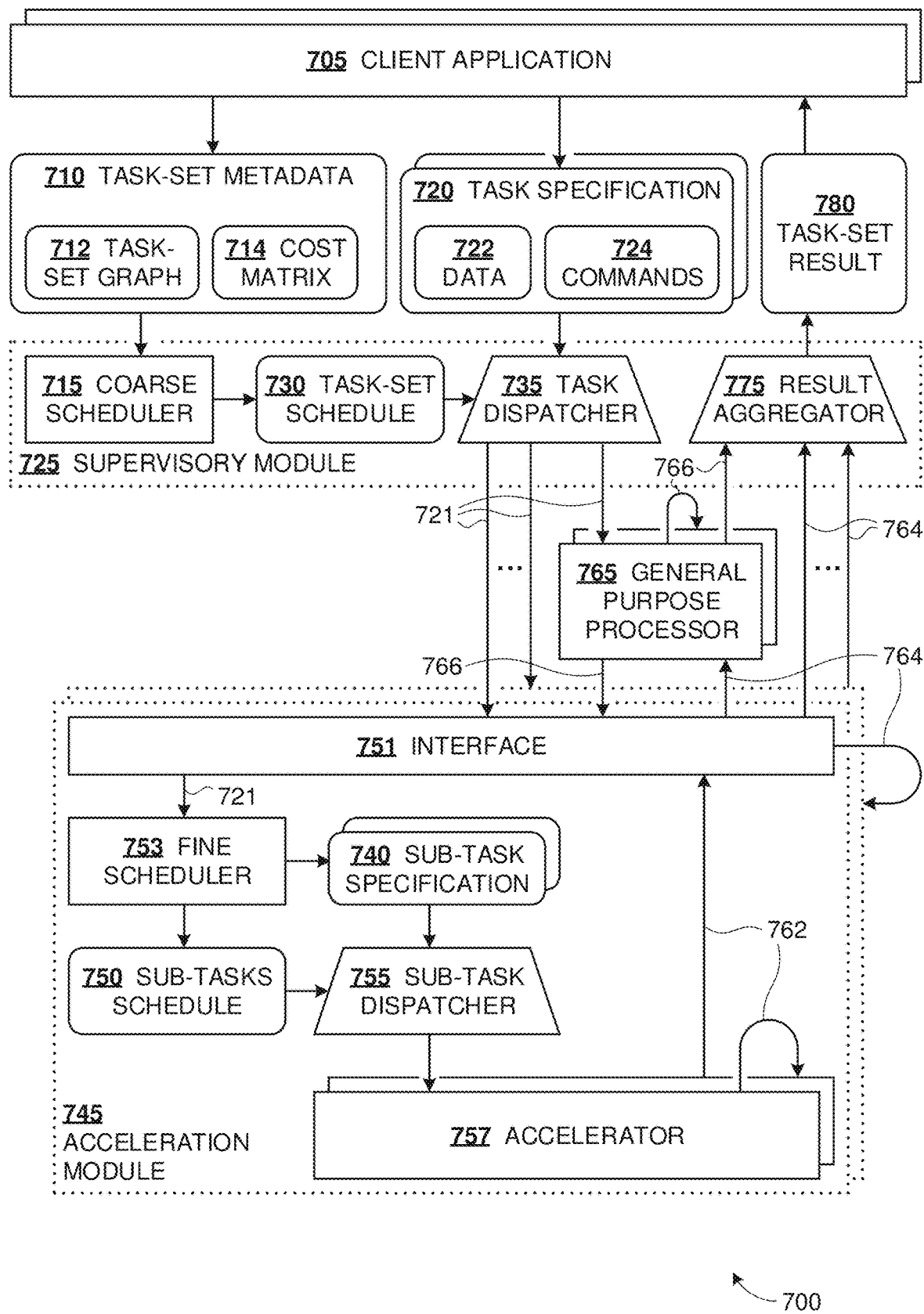
FIG. 7 is a dataflow diagram of a second example system implementing the disclosed technologies.

FIG. 7 is a dataflow diagram 700 of a second example system implementing hierarchical scheduling. In FIG. 7, hard-wired or software-implemented components are illustrated with angular corners, and data objects passed between these components are illustrated with rounded corners. FIG. 7 includes components of an innovative system together with environment components with which the innovative system can operate.

One or more client applications 705 can be coupled to supervisory module 725 to provide tasks to be scheduled and executed using the disclosed technologies. To illustrate, an image recognition application 705 can spawn an Inception v3 neural network task-set, which can be provided to the innovative system. The task-set can include task-set graph 712 and a cost matrix 714, similar to those described in context of FIGS. 1A-1B, in task-set metadata 710. Coarse scheduler 715 can operate on metadata 710 to generate task-set schedule 730, optimizing schedule 730 according to a predetermined criterion. As illustrated, task-set metadata 710 and task specifications 720 can be provided by developers of client application 705. In other examples, at least part of the task-set metadata 710 can be determined by a host processor separate from client application 705 using techniques disclosed herein. The combination of coarse scheduler 715 and task dispatcher 735 can be regarded as a coarse scheduling circuit module.

The task-set can also include specifications 720 of the constituent tasks of the instant task-set. Each task specification 720 can include a data segment 722 and a command segment 724. Data segment 722 can specify input or output data for the instant task and can variously include: literal data required as input for task execution; a link or reference to such literal data; a input data label matching another output data label among the task specifications 720; an output data label; or memory addresses to be used for input or output of data from the instant task. Command segment 724 can specify the work to be performed for the instant task and can variously include: program instructions for the instant task; a link or reference to such program instructions; a name or other identifier of the task to be performed; a name or other identifier of an accelerator kernel with which the task is to be performed.

Task-set schedule 730 and task specifications 720 can be provided as inputs to task dispatcher 735, which can route the constituent tasks (that is, task specifications 720) of the instant task-set among various processing resources according to task-set schedule 730. In some examples, task dispatcher 730 can dispatch tasks 721 on a just-in-time basis to respective processing resources, so that each processing resource acts on its designated tasks (including performing any necessary sub-task scheduling) as tasks 721 arrive. In other examples, task dispatcher 730 can dispatch tasks 721 in a correct order (as designated in task-set schedule 730) to each processing resource without regard to the scheduled time for that task 721. Tasks 721 dispatched to a given processing resource can be queued in a FIFO for the given processing resource until the given processing resource is ready to act on each such task 721 in turn.

Available processing resources can include one or more acceleration modules 745 and, optionally, one or more general purpose processors 765. That is, tasks providing the best overall performance improvement through acceleration can scheduled on an acceleration module 745, while other tasks can be scheduled on a general purpose processor 765. However, general purpose processors 765 are not a requirement. In some examples, a task-set can comprise solely tasks suitable for acceleration. A client application 705 can also perform general work locally within client application 705, leaving accelerable tasks for an innovative system.

In some examples, tasks 721 dispatched by task dispatcher 735 can include additional metadata beyond data and command segments 722, 724 of task specification 720. Task 721 can be accompanied by metadata indicating a particular time slot at which execution of the instant task is scheduled to begin or, in cases where an acceleration module 745 has a plurality of accelerators 757, an indication of a particular accelerator (or accelerators) on which the instant task is scheduled to be executed.

Each acceleration module 745 can include circuitry of interface sub-module 751, fine scheduler 753, and one or more accelerators 757. The combination of interface 751 and fine scheduler 753 can be regarded as a fine scheduling circuit module, which is coupled to the coarse scheduling circuit module (in particular, task dispatcher 735) and to accelerator(s) 757. Interface sub-module 751 can be configured to receive tasks 721 scheduled for accelerators 757. Fine scheduler 753 can be customized specifically for accelerator(s) 757 and can be configured to partition a given received task 721 into one or more streams of sub-tasks including at least some computation sub-tasks. Fine scheduler 753 can generate corresponding sub-task specifications 740 as output. Fine scheduler 753 can be further configured to schedule the computation sub-tasks among accelerator(s) 757 with, e.g., a sub-tasks schedule 750 generated as output.

Sub-task dispatcher 755 can receive sub-task specifications 740 and sub-tasks schedule 750 as input, and can be configured to dispatch sub-tasks 740 according to schedule 750. As for task dispatcher 735, sub-task dispatcher 755 can variously dispatch sub-tasks on a just-in-time basis, or in advance, to be queued among accelerators 757.

FIG. 7 also depicts routing of output data from tasks or sub-tasks. Arrows 762 denote sub-task output data routed within acceleration module 745, e.g. from one accelerator 757 to another accelerator 757, or to interface 751. In some examples, interface 751 can forward sub-task output data in streaming fashion as each sub-tasks output is received. In other examples, interface 751 can aggregate sub-task output data into consolidated task output data. Arrows 764 indicate paths for forwarding task output data (either streaming or consolidated) to another acceleration module 745 or to a general purpose processor 765 to be used as input for a subsequent task. In some instances, sub-task output data can be routed to multiple destinations. To illustrate, the same sub-task output data can be used by a subsequent sub-task of the same task, can be used at a different accelerator of an instant acceleration module 745, and can be part of the overall task output.

Task output data 764 can also be routed to result aggregator 775 in supervisory module 725, where various task results can be collected 780 for delivery to requesting client application 705. Like data output 764 from acceleration modules 745, data output 766 from general purpose processor 765 can also be routed to various destinations, including acceleration module 745 (as input for a downstream task), result aggregator 775 (as output from the task-set), or another general purpose processor. Task output data can be routed to multiple destinations. For example, an output of a given task can be input to two downstream tasks and also be part of overall task-set output 780.

Figure 8:
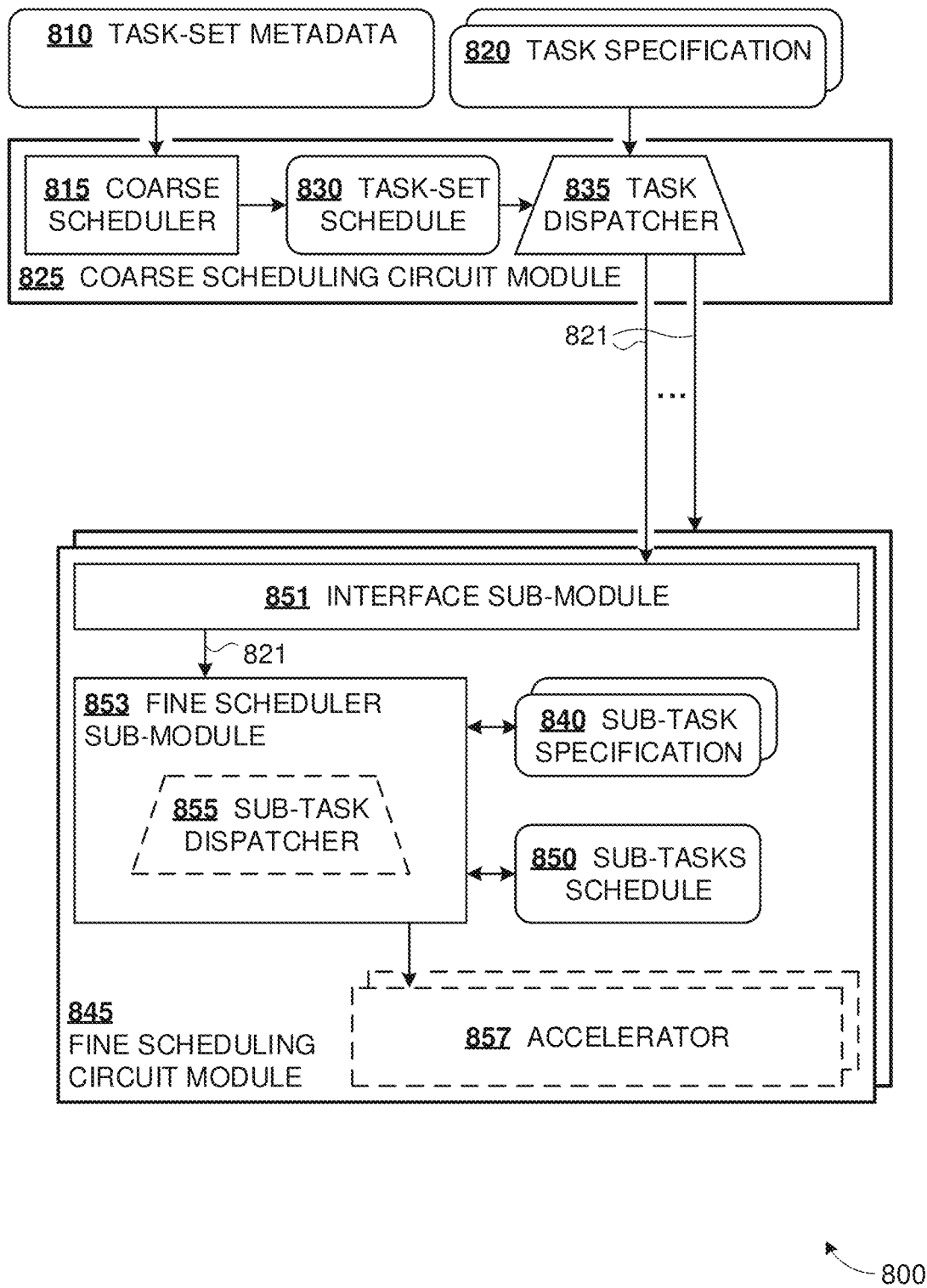
FIG. 8 is a block diagram of a third example system implementing the disclosed technologies.

Numerous variations and extensions can be implemented within scope of the disclosed technologies. Particularly, innovative systems can include varying combinations of the components illustrated in FIG. 7, while other illustrated components can be part of an environment of the innovative system. FIG. 8 is a block diagram 800 of a third example system based on the architecture of FIG. 7. In this system, coarse scheduling circuit module 815 incorporates coarse scheduler 815 (similar to 715 of FIG. 7) and task dispatcher 835 (735), and two or more fine scheduling circuit modules 845. Similar to FIG. 7, coarse scheduler can receive task-set metadata 810 and can generate therefrom task-set schedule 830 (based on optimization of a predetermined criterion) allocating tasks to respective acceleration modules 845. Dispatcher 835 can dispatch the scheduled tasks 820, 821 to acceleration modules 845. Each fine scheduling circuit module 845 can include interface sub-module 851 (751), configured to receive dispatched tasks 821, and accelerator-specific fine scheduler sub-module 853 (753). Sub-module 853 can be configured to partition received task 821 into one or more streams of sub-tasks 840 (including at least some computation sub-tasks) and generate a schedule 850 for execution of the computation sub-tasks among one or more accelerators 857. Sub-task dispatcher 855 (755) can optionally be included within fine scheduler 853 or can be omitted in cases where module 845 has a single accelerator 857. For example, scheduled sub-tasks can be queued in a FIFO and executed sequentially therefrom by accelerator 857.

Turning back to FIG. 7, certain components can be omitted altogether in some examples. To illustrate, acceleration module 745 can include just one accelerator 757; the system implementation can include just one acceleration module 745; or the overall implementation can include just one client application 705. In varying examples, zero, one, or more general purpose processors 765 can be provided for task execution.

In some examples, interface sub-module 751 can include a FIFO configured to queue tasks 721 received from task dispatcher 735. Sub-tasks 740 can include data-transfer sub-tasks in addition to the computation sub-tasks described above. The fine scheduling circuit module within each acceleration module 745 can include a respective memory controller (not shown) with inbound and outbound DMA engines. Fine scheduler 753 can be configured to schedule data-transfer sub-tasks for execution by the memory controller using the appropriate DMA engine. The data-transfer sub-tasks can be pipelined with the computation sub-tasks as described further herein. Data-transfer sub-tasks can transfer inbound data from a main memory to local memory of acceleration module 745, while outbound data can be transferred from local memory to the main memory. The memory controller can use DMA channels to read or write local memory, and can use a shared bus to read or write the main memory. The bus can be shared with other acceleration sub-modules 745, supervisory module 725, general purpose processor 765, or other components of an instant compute environment.

Sub-tasks partitioned from a given task can include instructions to configure memory-mapped I/O addresses. To illustrate, 0×1000 and 0×2000 can be written to accelerator-specific memory-mapped addresses to configure the accelerator to read sub-task input data starting at location 0×1000 in local memory and to write sub-task output data starting at location 0×2000 of local memory. Exemplary DMA-specific memory-mapped addresses can be written 0×4000 0000 and 0×1000 to cause inbound DMA to transfer data starting at main memory address 0×4000 0000 to local memory starting at address 0×1000, and similarly for outbound DMA. Additional memory-mapped addresses can be used to specify a transfer count, i.e. how much data is to be read or written. Still further, memory-mapped addresses can be used to trigger a sub-task or indicate completion of the sub-task.

Coarse scheduler 715 can perform scheduling to minimize a makespan of the task-set. Coarse scheduler 715 can be configured to implement PEFT, HEFT, CEFT, or another heuristic procedure to derive task-set schedule 730 from task-set metadata 710. In further examples, successive task-set metadata 710 can be queued in a FIFO (similar to 311) coupled between coarse scheduler 715 and one or more hosts generating task-set metadata 710 for respective jobs.

For neural network applications, accelerators 757 can implement respective neural network kernels, each accelerator configured as a convolution kernel, a batch normalization kernel, or a fully-connected layer kernel. Accelerator circuits 757 can implement at least two different types of convolution kernels. In further applications, the accelerators can include two or more classes of accelerators 757. Non-limiting examples of accelerator classes include: a neuromorphic array; a field-programmable gate array (FPGA); a general-purpose graphics processor unit (GPGPU); or an application specific integrated circuit (ASIC).

In some examples, fine scheduler 753 and interface 751 can be implemented as hard-wired circuitry. In other examples, coarse scheduler 715 and fine scheduler 753 can be implemented on distinct respective processor cores executing scheduling instructions. In varying examples, software fine scheduler 753 can be deterministic (like FIG. 6) or can perform heuristic optimization using e.g., PEFT. In further examples, coarse scheduler 715 and fine scheduler 753 can be implemented on a common chip.

Example Chipset

Figure 9:
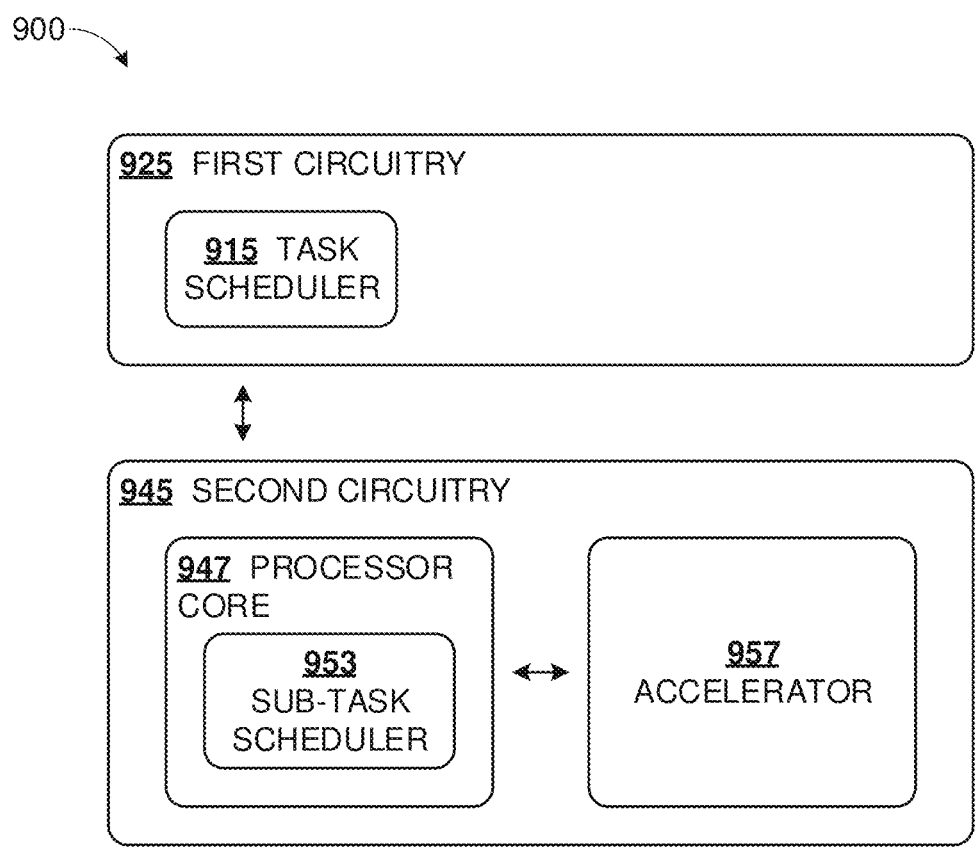
FIG. 9 is a block diagram of an example chipset according to the disclosed technologies.

FIG. 9 is a block diagram 900 of an example chipset according to the disclosed technologies. First circuitry 925 can implement a task scheduler 915. Second circuitry 945 can implement sub-task scheduler 953 and accelerator 957. Second circuitry 945 can incorporate processor core 947. First circuitry 925 and second circuitry 945 can be coupled together but distinct. First circuitry 925 can be configured to dispatch a first task to second circuitry 945 based on output from task scheduler 915. Sub-task scheduler 953 can be configured to schedule a plurality of sub-tasks of the first task for execution at accelerator 957.

Numerous variations and extensions of the illustrated chipset can be implemented within scope of the disclosed technologies. As illustrated, sub-task scheduler 953 can be implemented as program instructions executed on core 947, while accelerator 957 can be implemented as a hard-wired circuit. However, this is not a requirement and, in other examples, sub-task scheduler 953 can be implemented as hard-wired circuitry of a peripheral device coupled to and controlled by processor core 947. In alternative examples, accelerator 957 can be implemented as program instructions executed on core 947 or on another processor. To illustrate, processor core 947 can be a RISC-V processor core which can be configured to execute instructions of sub-task scheduler 953, and a GPGPU alongside core 947 can be configured to execute program instructions of accelerator 957.

First circuitry 925 can incorporate another processor core. In some examples, this processor core can be configured to implement task scheduler 915 by executing corresponding program instructions. In other examples, task scheduler 915 can be hard-wired circuitry of a peripheral device coupled to and controlled by the another processor.

In further examples, the chipset can include N additional instances of circuitry having similar functionality as second circuitry 945, but having possible differences in accelerator types or other internal implementation. For example, with N=1, a third circuitry can implement a second accelerator and a second processor core, with the second processor core configured to implement a second sub-task scheduler. First circuitry 925 can be configured to dispatch a second task to the third circuitry based on output of task scheduler 915. The second sub-task scheduler can be configured to schedule a plurality of sub-tasks of the second task for execution on the second accelerator. In further examples, N can be any positive integer, such as 2, 3, any number from 4 to 10, 11 to 100, 101 to 1000, or 1001 to 1 million.

For a chipset having three or more accelerators (e.g. in second circuitry 945, and in N≥2 additional circuitries), the accelerators can include three or more mutually heterogeneous accelerators or accelerators of different classes. In some examples, the chipset can be implemented as a single chip.

Accelerator 957 can implement diverse functions including, without limitation: a neural network layer, convolution, matrix arithmetic, matrix analysis, compression, encryption, domain transformation, a bit blit function, regular expression search, wireless coding, or beamforming. In some examples, processor 947 can control reconfiguration of accelerator 957 to implement at least two of the above functions.

Within second circuitry 945, the plurality of sub-tasks of the first task can be scheduled as a pipeline of first data-transfer sub-tasks, second computation sub-tasks, and third data-transfer sub-tasks. The first sub-tasks can load input data of the first task into local memory of accelerator 957 and the third sub-tasks can transfer output data of the first task out from the local memory of accelerator 957 to a destination. The first and third data-transfer sub-tasks can be executed by DMA facilities within second circuitry 945. The second computation sub-tasks can be executed by accelerator 957. The pipeline of sub-tasks can be performed concurrently. In examples, at least 50% of the second computation sub-tasks can be performed concurrently with (i) a first data-transfer sub-task (data in) or (ii) a third data-transfer sub-task (data out).

Example Methods

Figure 10:
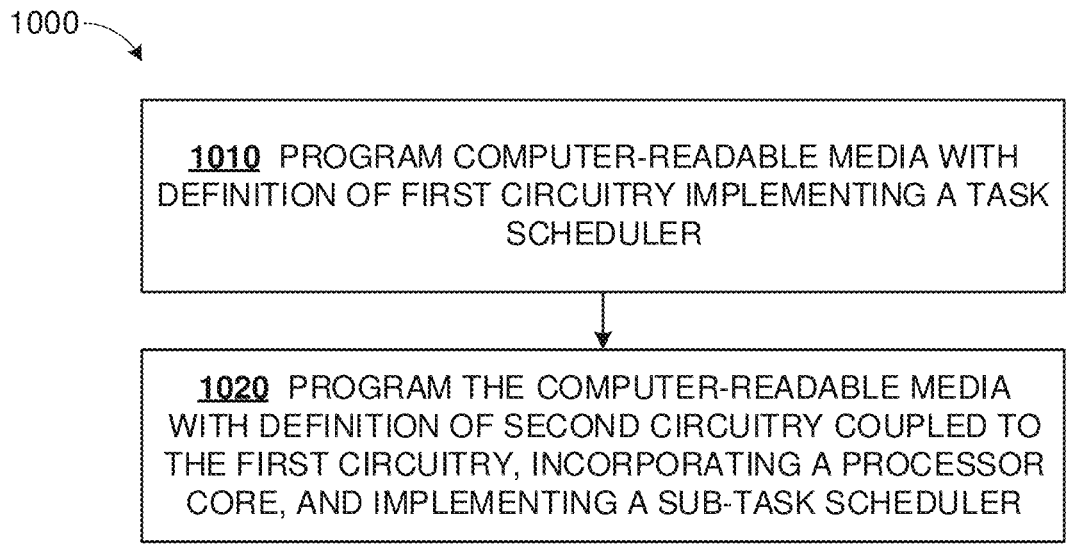
FIG. 10 is a flowchart of an example method according to the disclosed technologies.

FIG. 10 is a flowchart 1000 of an example method according to the disclosed technologies. In this method, computer-readable media are programmed with definitions of circuitry implementing hierarchical task schedulers as described herein. The computer-readable media can be any non-transitory or tangible storage media as described herein or otherwise known in the art.

At process block 1010, a definition of first circuitry implementing a task scheduler can be produced. At process block 1020, a definition of second circuitry can be produced, the second circuitry incorporating a processor core and implementing a sub-task scheduler. The first circuitry can be configured to dispatch a first task to the second circuitry based on output from the task scheduler. The sub-task scheduler can be configured to schedule sub-tasks of the first task for execution at an accelerator. The computer-readable descriptions can be stored on computer-readable media usable for fabricating masks or reticles for manufacturing integrated circuits implementing the first circuitry and the second circuitry. The method can be performed using EDA tools.

Numerous variations or extensions of this method can be implemented within the scope of the disclosed technologies. The method can extend to programming the computer-readable media with one or more accelerators coupled to receive sub-task definitions from the second circuitry and execute the sub-task specifications as scheduled by the sub-task scheduler. The method can extend to programming the computer-readable media with additional sub-task schedulers configured to schedule sub-tasks of respective tasks on respective accelerators.

Figure 11:
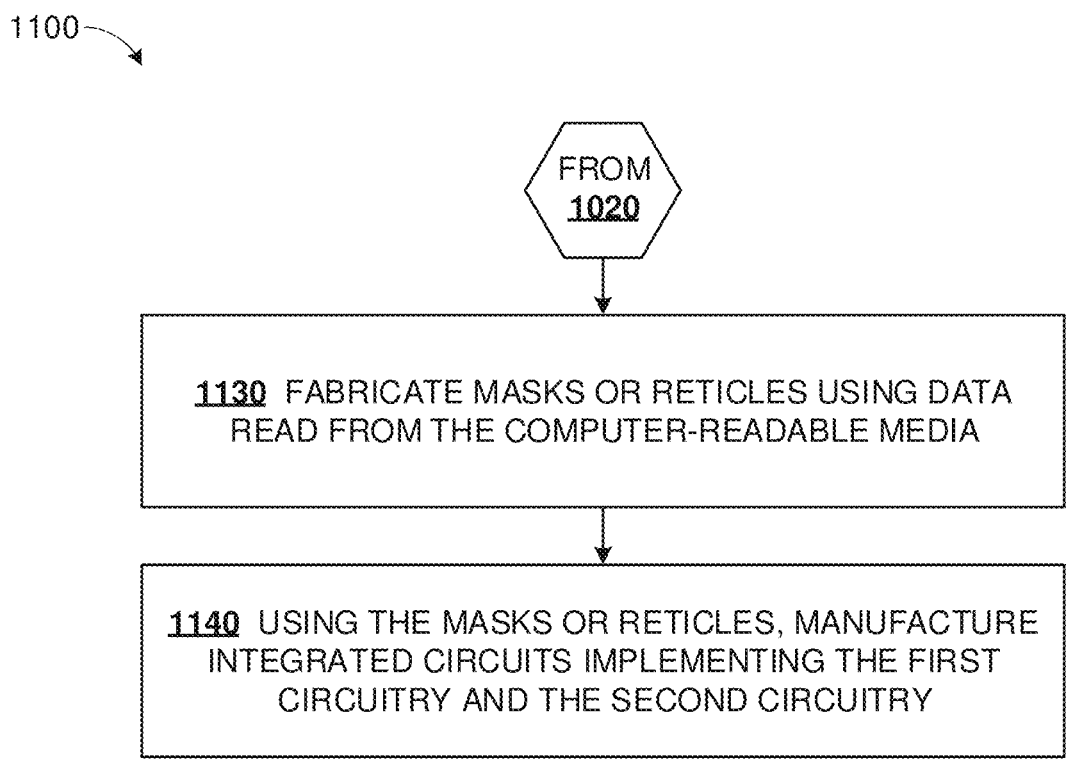
FIG. 11 is a flowchart of an example extension to the method of FIG. 10 according to the disclosed technologies.

FIG. 11 is a flowchart 1100 of another example extension to the method of FIG. 10. This extension proceeds from block 1020. At process block 1130, the masks or reticles can be fabricated using the stored definitions of the first and second circuitry. Then, at process block 1140, the fabricated masks or reticles can be used to manufacture the integrated circuits implementing the first circuitry and the second circuitry. In varying examples, the manufactured integrated circuits can include both first circuitry and second circuitry on a common die or on separate dice.

Still further extensions of the methods of FIGS. 10-11 can be implemented incorporating other features described herein. For example, the computer-readable media can be programmed with a definition of a FIFO coupled between the first circuitry and the second circuitry, and configured to queue tasks dispatched from the first circuitry for sub-task scheduling at the second circuitry or execution by an accelerator associated with the second circuitry.

Example Neural Network Applications

Figure 12:
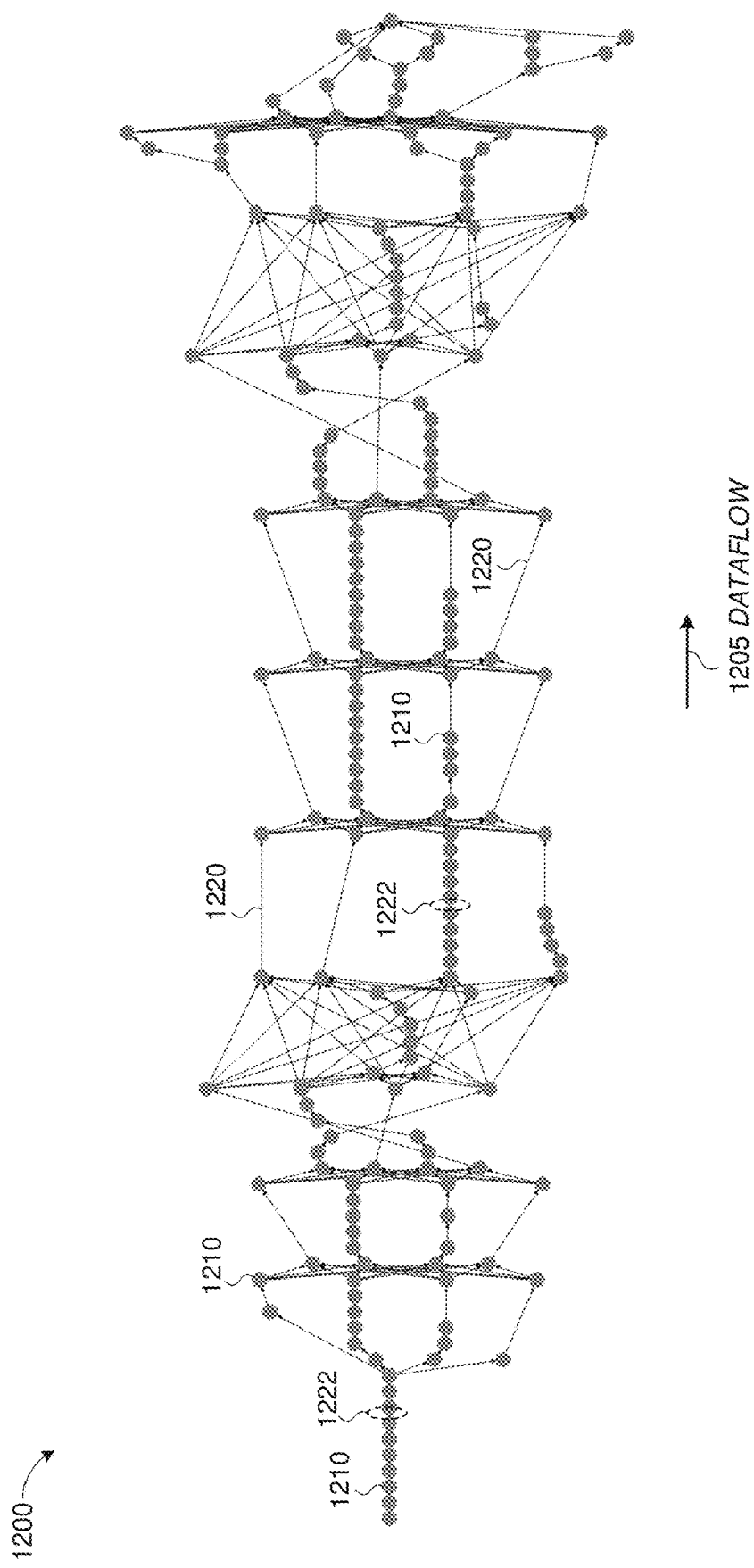
FIG. 12 is a directed acyclic graph (DAG) of an Inception-v3 task-set to which examples of the disclosed technologies can be applied.

FIG. 12 is a directed acyclic graph (DAG) 1200 of an Inception-v3 task-set to which examples of the disclosed technologies can be applied. The Inception-v3 neural network finds use in some image classification applications. Vertices of DAG 1200 are shown as dots 1210. Each dot 1210 represents one layer of Inception-v3 which can be performed as a corresponding task. The data flow of FIG. 12 is from left to right as indicated by arrow 1205. Layer dependencies are represented by directed edges 1220. Adjoining tasks are understood to have an implied edge 1222 between them, oriented in the direction of data flow 1205. Each edge connects a source layer whose output is provided as input to a destination layer to its right. Some layers are fed from a single upstream layer and in turn feed a single downstream layer, while other layers have as many as six upstream layers or six downstream layers. Inception-v3 has 189 layers (which map 1:1 to vertices of DAG 1200 or to tasks) to be executed to obtain e.g., a classification of an input image.

Presented below are some performance results for the disclosed technologies applied to Inception-v3 client applications. Additional performance results are presented for U-Net, ResNet-50, and VGG-16 client applications. ResNet-50 is a 50 layer deep neural network also used for image classification, using residuals and skip connections to provide bypass paths around one or more intermediate layers. VGG-16 is a 16-layer deep convolutional neural network providing image classification into 1024 categories. U-Net is a convolutional neural network used for image segmentation, featuring upsampled output stages and increased output image resolution.

Example Comparisons

A range of innovative and conventional systems have been designed and simulated. A base design ("Design-1") includes five convolutional accelerators varying from 64 to 1024 MAC units with 128 to 256 kB of local SRAM; five batch normalization accelerators varying from 64 to 1024 MAC units with 0.5 to 8 kB of local SRAM; and five fully connected accelerator kernels varying from 64 to 1024 MAC units with uniform 128 kB of local SRAM. Advanced designs 2-10 respectively include 2-10× the convolutional accelerators of Design-1 and uniformly twice the batch normalization and fully connected accelerators of Design-1 (i.e. Design-10 has 50 convolutional accelerators and 10 each batch normalization and fully connected accelerators). Advanced designs A-H respectively include 1-8× all the accelerators of Design-1. That is, Design-H has 40 convolutional accelerators, 40 batch normalization accelerators, and 40 fully connected accelerators. Design-A and Design-B are identical to Design-1 and Design-2 respectively.

1. Simulation Results

Each design was packaged into a conventional system according to FIG. 2 and an innovative system according to FIG. 3, including schedule generation at block 215 or at blocks 315 and 353A-353C. The packaged systems were simulated on a GEMS cycle-level simulator for client applications Inception-v3, ResNet-50, for U-Net, and VGG-16. The coarse scheduling task at block 315 requires scheduling 189 tasks for Inception-v3, 107 tasks for ResNet-50, 17 tasks for U-Net, or 16 tasks for VGG-16. Because of the limited local memory of the various accelerators, the conventional scheduler of block 215 was provided with finer grain tasks compatible with the accelerator memory constraints. Thus, the task count for the conventional systems was 20,469 for Inception-v3 (a 108-fold increase over the innovative system), 6,824 for ResNet-50 (64×), 12,372 for U-Net (728×), or 38,064 for VGG-16 (2,379×). However, to prevent scheduling time from ballooning for the higher task counts, the heuristic PEFT scheduler was constrained to 1 ms maximum for schedule generation.

Makespan was determined for both the conventional and innovative systems. In all cases, makespan for the innovative systems was dramatically reduced compared to the conventional systems. Average makespan reduction was by factors of 17.66 for Inception-v3, 9.10 for ResNet-50, 6.96 for U-Net, and 16.96 for VGG-16.

Relaxing the 1 ms scheduling constraint can potentially lead to more efficient schedules, however improvements to task-set execution time can be outweighed by increased scheduling time. Conventional systems are unlikely to do significantly better on the given applications with the given accelerator ensembles.

2. Area Results

The innovative designs include a RISC-V core (similar to 345A) and some additional logic compared to the comparative designs based on FIG. 2. This extra circuitry was found to impose an 2-3% overhead on die area for the innovative system.

As another comparison, another suite of conventional systems was modeled, providing increased local memory at each accelerator to avoid the ballooning task count (64-2379x) described above. Whereas innovative Designs 1-10 can be fabricated in a representative 16 nm process in 11-68 mm$^2$ dice, the expanded-memory conventional systems were found to require 165-662 mm$^2$ die area, which can be impractical. On average, the innovative systems were found to have about 11% higher makespans than the expanded-memory systems, attributable to overhead of fine scheduling.

3. Conclusion

On average, the evaluation of innovative and comparative systems shows 12.7× improvement in makespan for 2.7% area overhead for fine scheduling circuitry, if accelerator areas are held fixed. From another perspective, the innovative systems provide 10× improvement in area for about 11% makespan overhead, if task organization is held fixed. Regardless of perspective, the described technologies provide compelling benefits.

Example Scaling Performance

Figure 13:
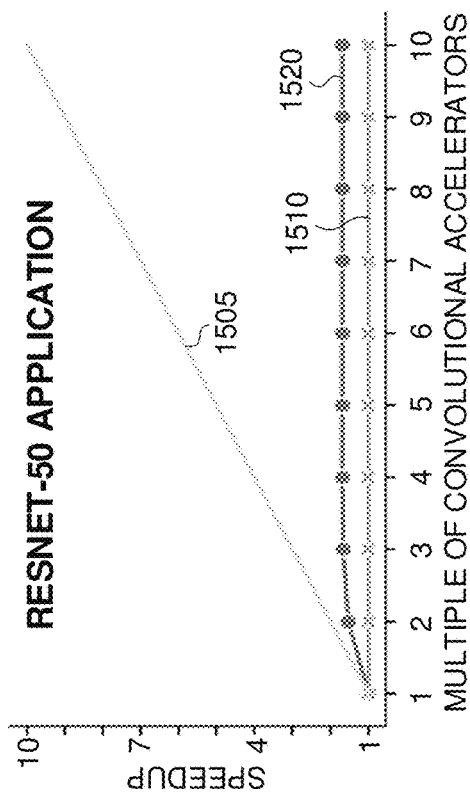
FIG. 13 is a first chart illustrating strong scaling performance of examples of the disclosed technologies.

FIGS. 13-16 are charts 1300, 1400, 1500, 1600 illustrating strong scaling performance of the disclosed technologies for Inception-v3, U-Net, ResNet-50, and VGG-16 neural network client applications, respectively. Horizontal coordinates 1-10 denote Design-1 to Design-10 which have 1-10× the number of convolutional accelerators as Design-1. For each Design, makespans were measured for 10 parallel instances of the noted application (e.g. Inception-v3 in FIG. 13) for an innovative system and for a conventional system. A speedup factor was determined relative to the conventional system. In FIG. 13, graph 1320 shows the speedup of the innovative system, Speedup=Conventional_Makespan/Innovative_Makespan. For reference, graph 1310 shows the baseline speedup=1. Additionally, graph 1305 shows a hypothetical speedup equal to the accelerator multiple on the horizontal axis. The speedup of graph 1320 is seen to plateau at a speedup of about 2.5. Examination of DAG 1200 shows that significant portions of Inception-v3 lack parallelism, i.e. tasks are executed sequentially. Accordingly, for these portions, 10 instances of Inception-v3 can utilize at most 10 convolutional accelerators. Because Design-3 has 15 convolutional accelerators—and larger Designs 4-10 have even more—convolutional accelerators are often idle ("task starvation") and speedup can plateau.

Figure 14:
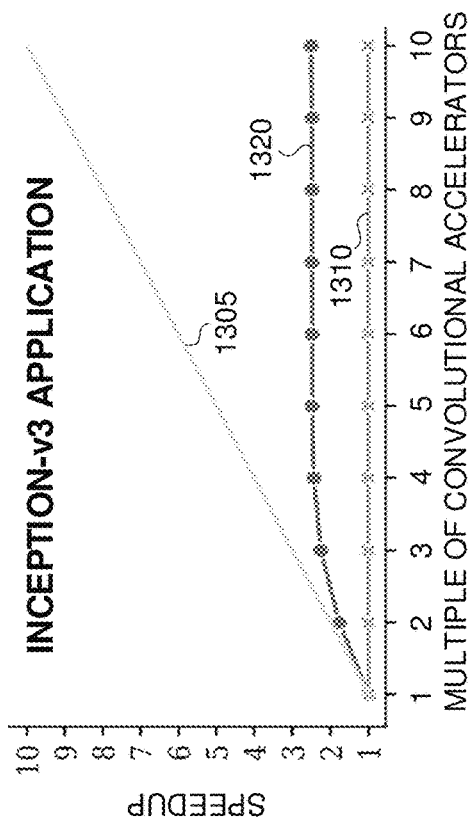
FIG. 14 is a second chart illustrating strong scaling performance of examples of the disclosed technologies.
Figure 15:
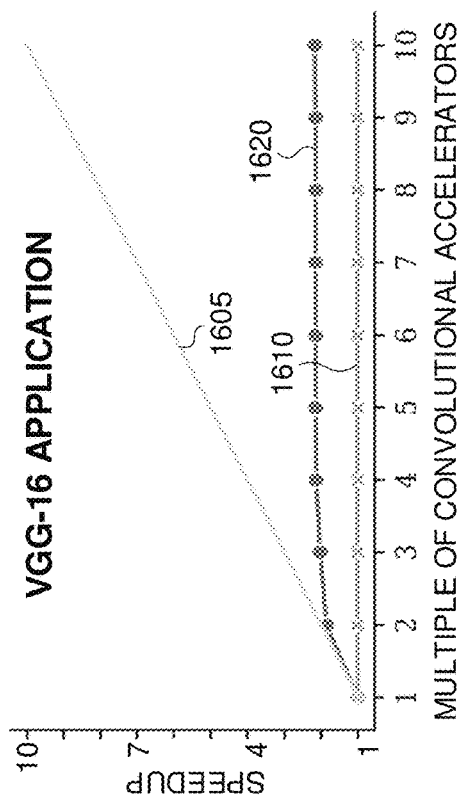
FIG. 15 is a third chart illustrating strong scaling performance of examples of the disclosed technologies.
Figure 16:
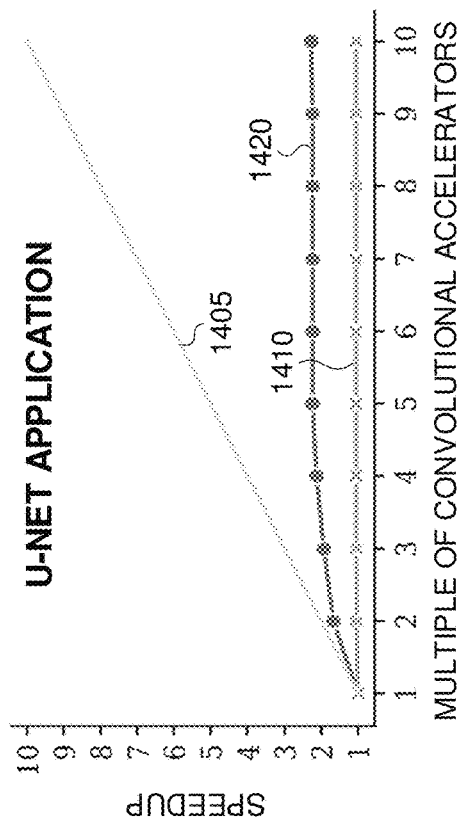
FIG. 16 is a fourth chart illustrating strong scaling performance of examples of the disclosed technologies.

FIGS. 14-16 are similar. Graphs 1420, 1520, 1620 show speedup of innovative designs for 10 parallel U-Net, ResNet-50, and VGG-16 client applications respectively, while graphs 1410, 1510, 1610 show baseline speedups=1 for comparison, and graphs 1405, 1505, 1605 show hypothetical speedup equal to the accelerator multiple on the horizontal axis. Graphs 1420, 1520, 1620 show similar plateaus as graph 1320, although the precise maximum speedup varies according to details of the underlying task graphs.

To study scaling without task starvation, another set of scaling studies was performed with varying numbers of applications (205, 305) generating tasks.

Figure 17:
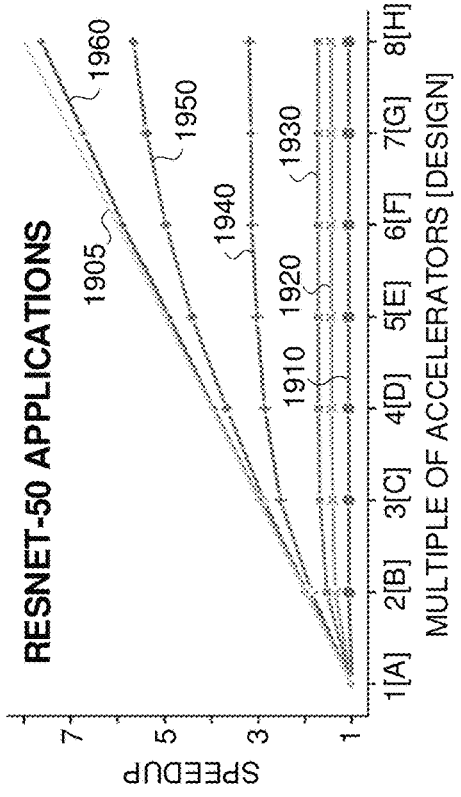
FIG. 17 is a first chart illustrating weak scaling performance of examples of the disclosed technologies.

FIGS. 17-20 are charts 1700, 1800, 1900, 2000 illustrating weak scaling performance of the disclosed technologies for Inception-v3, U-Net, ResNet-50, and VGG-16 neural network client applications, respectively. The horizontal coordinate 1[A]-8[H] indicates Design-A to Design-H which have 1-8× the number of accelerators as Design-1. For each Design, makespans were measured for varying numbers of application instances (e.g. Inception-v3 in FIG. 17) for an innovative system and for a conventional system. A speedup factor was determined relative to the conventional system. In FIG. 17, graph 1710 shows the speedup of the innovative system, Speedup=Conventional_Makespan/Innovative_Makespan with four instances of the Inception-v3 application. Graphs 1720, 1730, 1740, 1750, 1760 show the corresponding speedup for 8, 10, 20, 40, and 100 application instances. Additionally, graph 1705 shows a hypothetical speedup equal to the accelerator multiple on the horizontal axis. FIG. 17 demonstrates good scaling and shows that, with sufficient client applications, a large number of accelerators can be effectively utilized in a single system. (Design H has 120 accelerators.)

Figure 19:
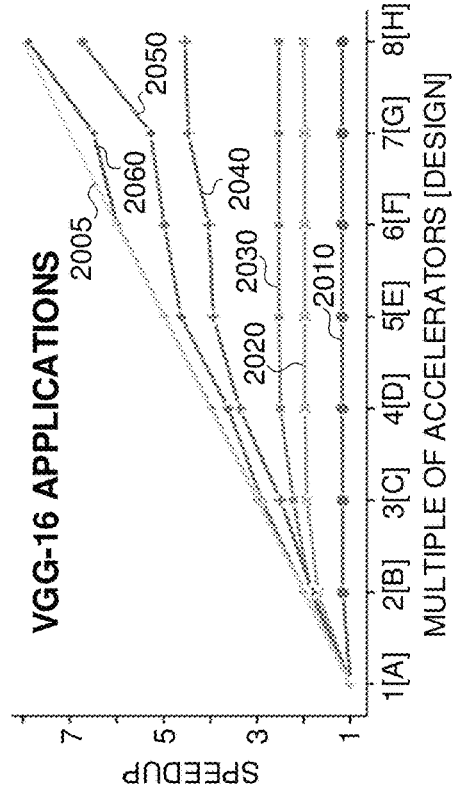
FIG. 19 is a third chart illustrating weak scaling performance of examples of the disclosed technologies.
Figure 18:
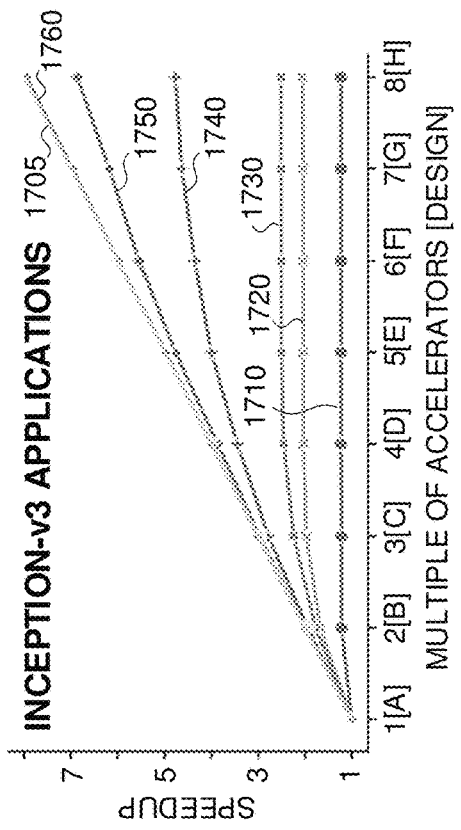
FIG. 18 is a second chart illustrating weak scaling performance of examples of the disclosed technologies.
Figure 20:
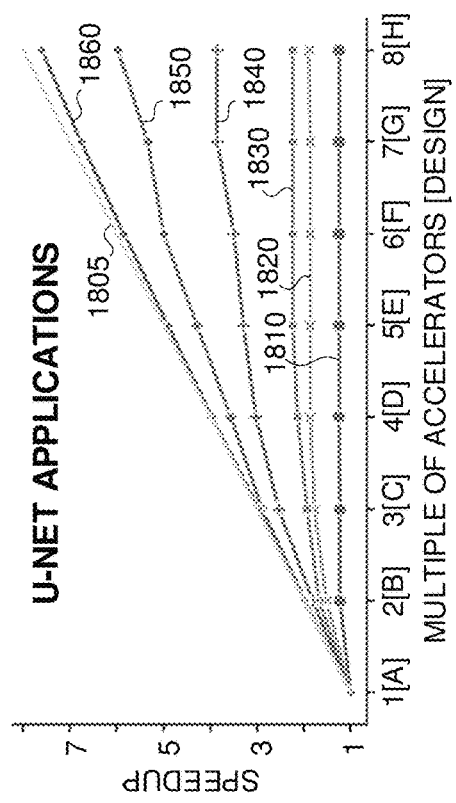
FIG. 20 is a fourth chart illustrating weak scaling performance of examples of the disclosed technologies.

FIGS. 18-20 are similar. In FIG. 18, graphs 1810-1860 show speedup of innovative designs for 4, 8, 10, 20, 40, and 100 U-Net application instances respectively. In FIG. 19, graphs 1910-1960 show speedup of innovative designs for 4, 8, 10, 20, 40, and 100 ResNet-50 application instances respectively. In FIG. 20, graphs 2010-2060 show speedup of innovative designs for 4, 8, 10, 20, 40, and 100 VGG-16 application instances respectively. Graphs 1805, 1905, 2005 show hypothetical speedup equal to the accelerator multiple on the horizontal axis. Like FIG. 17, FIGS. 18-20 also demonstrate good scaling and effective accelerator utilization.

A Generalized Computer Environment

Figure 21:
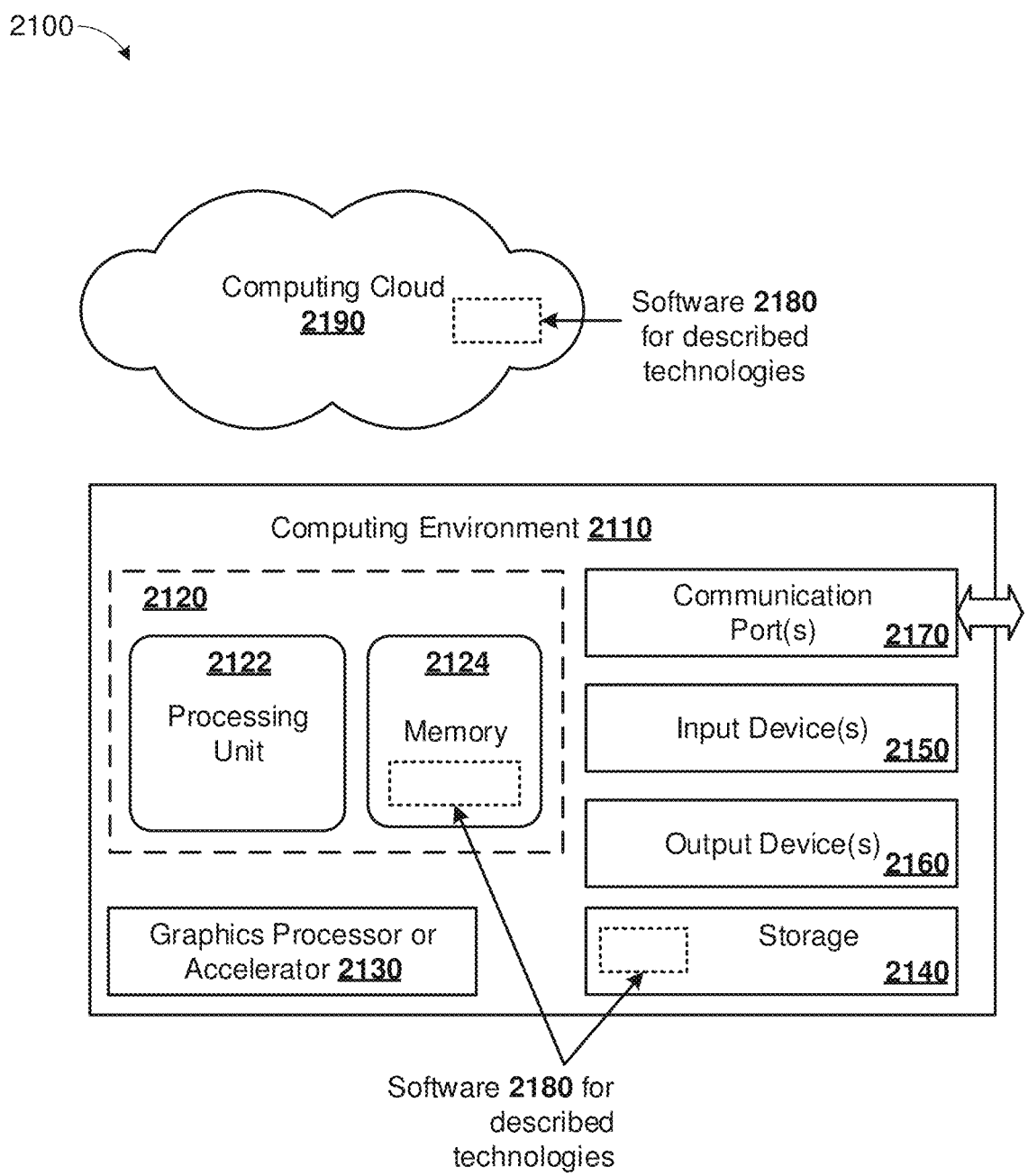
FIG. 21 illustrates a generalized example of a suitable computing environment in which described embodiments, techniques, and technologies pertaining to task scheduling can be implemented.

FIG. 21 illustrates a generalized example of a suitable computing system 2100 in which some described examples, techniques, and technologies for task scheduling or task execution can be implemented. The computing system 2100 is not intended to suggest any limitation as to scope of use or functionality of the present disclosure, as the innovations can be implemented in diverse general-purpose or special-purpose computing systems. The computing system 2100 can determine a task-set metadata for a computation job; schedule or dispatch the tasks of a task-set among a plurality of computing resources; partition a task into sub-tasks; schedule or dispatch the sub-tasks to one or more accelerators; execute sub-tasks; transfer data among tasks, sub-tasks, or client applications; configure or monitor scheduling or acceleration resources; or acquire, process, output, or store associated programs or data.

With reference to FIG. 21, computing environment 2110 includes one or more processing units 2122 and memory 2124. In FIG. 21, this basic configuration 2120 is included within a dashed line. Processing unit 2122 can execute computer-executable instructions, such as for control or data transfer as described herein. Processing unit 2122 can be a general-purpose central processing unit (CPU), a processor in an application-specific integrated circuit (ASIC), a RISC-V processing core, a processor in an FPGA, a general purpose graphics processing unit, a neuromorphic processor, or any other type of processor. In a multi-processing system, multiple processing units execute computer-executable instructions to increase processing power. Computing environment 2110 can also include a graphics processing unit, co-processing unit, or accelerator 2130. Tangible memory 2124 can be volatile memory (e.g., registers, cache, queue, or RAM), non-volatile memory (e.g., ROM, EEPROM, or flash memory), or some combination thereof, accessible by processing units 2122, 2130. The memory 2124 stores software 2180 implementing one or more innovations described herein, in the form of computer-executable instructions suitable for execution by the processing unit(s) 2122, 2130. The memory 2124 can also store task-set metadata, task specifications, task input data, task output data, neural network weights, schedules, pointers, queues, control parameters, configuration data, or operational data.

A computing system 2110 can have additional features, such as one or more of storage 2140, input devices 2150, output devices 2160, or communication ports 2170. An interconnection mechanism (not shown) such as a bus, controller, or network interconnects the components of the computing environment 2110. Typically, operating system software (not shown) provides an operating environment for other software executing in the computing environment 2110, and coordinates activities of the components of the computing environment 2110.

The tangible storage 2140 can be removable or non-removable, and includes magnetic disks, magnetic tapes or cassettes, CD-ROMs, DVDs, or any other medium which can be used to store information in a non-transitory way and which can be accessed within the computing environment 2110. The storage 2140 stores instructions of the software 2180 (including instructions and/or data) implementing one or more innovations described herein. Storage 2140 can also store task-set metadata, task specifications, task input or output data, neural network weights, schedules, pointers, queues, configuration data, or other data items or data structures described herein.

The input device(s) 2150 can be a mechanical, touch-sensing, or proximity-sensing input device such as a keyboard, mouse, pen, touchscreen, or trackball, a voice input device, a scanning device, or another device that provides input to the computing environment 2110. The output device(s) 2160 can be a display, printer, speaker, optical disk writer, or another device that provides output from the computing environment 2110. Input or output can also be communicated to/from a remote device over a network connection, via communication port(s) 2170.

The communication port(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 2100 can also include a computing cloud 2190 in which instructions implementing all or a portion of the disclosed technology are executed. Any combination of memory 2124, storage 2140, and computing cloud 2190 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computer," "computing system," "computing environment," and "computing device" are used interchangeably herein. Unless the context clearly indicates otherwise, none of the terms imply any limitation on a type of computing apparatus. In general, a computing apparatus can be local or distributed, and can include any combination of special-purpose hardware (e.g. an accelerator or hard-wired processing circuitry) and/or general-purpose hardware (e.g. a RISC core) and/or virtualized hardware, together with software implementing described functionality.

General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase, and do not imply that the joined terms are mutually exclusive.

The systems, methods, and apparatus described herein should not be construed as limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "accumulate," "buffer," "compute," "configure," "determine," "dispatch," "distribute," "evaluate," "execute," "generate," "implement," "indicate," "interface," "operate," "optimize," "output," "partition," "perform," "pipeline," "process," "produce," "provide," "queue," "read," "receive," "reset," "retrieve," "schedule," "select," "set," "store," "stream," "transfer," "transmit," "update," "use," and "write" to describe operations performed or controlled by a processor or circuit module in a computer system. These terms can be high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 21, computer-readable storage media include memory 2124 and storage 2140. The terms computer-readable storage media or computer-readable media do not include signals and carrier waves. In addition, the terms computer-readable storage media or computer-readable media do not include communication ports.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, Qt, R, Ruby, SAS, SPSS, SQL, WebAssembly, any derivatives thereof, or any other suitable programming language, or, in some examples, markup languages such as HTML or XML, or with any combination of suitable languages, libraries, and packages. Likewise, the disclosed technology is not limited to any particular computer or type of hardware. Hard-wired implementations can be implemented using electronic design automation (EDA) tools, with the aid of Verilog or VHDL languages. Certain details of suitable computers, hardware, or digital circuitry are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples of the disclosed subject matter and should not be taken as limiting the scope of the claims. Rather, the scope of the claimed subject matter is defined by the following claims. We therefore claim as our invention all that comes within the scope of these claims and their equivalents.

We claim:

1. A system for scheduling tasks among a plurality of accelerator circuits, the system comprising:
   a hierarchical task scheduler comprising:
     a coarse scheduling circuit module configured to:
       receive task-set metadata comprising a task graph having vertices representing respective tasks and directed edges, each from a respective source vertex of the vertices to a respective destination vertex of the vertices, joining respective pairs of the vertices, each of the directed edges having a weight representing a measure of data transfer from an upstream task represented by the respective source vertex to a downstream task represented by the respective destination vertex;
       based on the task graph, schedule tasks from the task-set metadata among the plurality of accelerator circuits to minimize a makespan; and
       dispatch the scheduled tasks to the plurality of accelerator circuits; and
     two or more fine scheduling circuit modules, wherein each fine scheduling circuit module is communicatively coupled with the coarse scheduling circuit module and with a corresponding accelerator circuit from among the plurality of accelerator circuits, the corresponding accelerator circuit having a limited amount of local memory storage for computation and data transfers;
     wherein the each fine scheduling circuit module comprises:
       an interface sub-module configured to receive, from the coarse scheduling circuit module, the tasks scheduled for the corresponding accelerator circuit; and
       an accelerator-specific scheduler (AS) sub-module configured to:
         partition, for a given task of the received scheduled tasks, the given task into two or more streams of first sub-tasks, including: a first stream comprising computation sub-tasks each requiring one tile of the local memory storage; and a second stream comprising data-transfer sub-tasks; and
         schedule the computation sub-tasks to execute synchronously and in parallel with the data-transfer sub-tasks on the corresponding accelerator circuit, each of the computation sub-tasks executing in a respective first time slot and having input or output data transferred by a respective one of the data-transfer sub-tasks in a second time slot adjacent to the first time slot;
       wherein the AS sub-module enables the received scheduled tasks to be executed at the corresponding accelerator circuit with the limited amount of the local memory storage being less than or equal to two tiles of the local memory storage.

2. The system of claim 1, wherein the interface sub-module comprises a first-in first-out queue (FIFO) configured to queue the received scheduled tasks.

3. The system of claim 1, wherein:
   the each fine scheduling circuit module further comprises a respective memory controller; and
   the AS sub-module is configured to schedule the data-transfer sub-tasks to be executed by the respective memory controller.

4. The system of claim 3, wherein the respective memory controller is communicatively coupled with accelerator-side static random-access memory (SRAM) through a direct memory access (DMA) channel, and is communicatively coupled with main memory through a bus shared among the two or more fine scheduling circuit modules.

5. The system of claim 1, wherein the first sub-tasks comprise instructions to configure accelerator-specific memory-mapped addresses and DMA-specific memory-mapped addresses.

6. The system of claim 1, wherein the accelerator circuits comprise respective neural network kernels, each of the neural network kernels configured as a convolution kernel, a batch normalization kernel, or a fully-connected layer kernel.

7. The system of claim 1, wherein the accelerator circuits comprise convolution kernels of multiple types.

8. The system of claim 1, wherein the coarse scheduling circuit module and at least one of the fine scheduling circuit modules comprise distinct respective processor cores configured to execute respective scheduling instructions.

9. The system of claim 1, wherein at least one of the fine scheduling circuit modules is implemented as a hard-wired circuit.

10. The system of claim 1, wherein the coarse scheduling circuit module and at least one of the fine scheduling circuit modules are implemented on a common chip.

11. A chipset comprising:
    the system of claim 1; and
    the plurality of accelerator circuits.

12. The system of claim 11, wherein the accelerator circuits comprise two or more of: a neuromorphic array, a field-programmable gate array (FPGA), a general-purpose graphics processor unit (GPGPU), or an application specific integrated circuit (ASIC).

13. A high-performance computing (HPC) apparatus comprising:
    the system of claim 1;
    a host processor configured to provide the task-set metadata to the coarse scheduling circuit module; and
    the plurality of accelerator circuits.

14. A chipset comprising:
    first circuitry configured to implement a task scheduler; and
    second circuitry, distinct from and coupled to the first circuitry, incorporating a processor core and implementing an accelerator, the accelerator having only a given amount of local memory storage for computation and data transfers, and a sub-task scheduler;

wherein the task scheduler is configured to receive task-set metadata comprising a task graph having vertices representing respective tasks and directed edges, each from a respective source vertex of the vertices to a respective destination vertex of the vertices, joining respective pairs of the vertices, each of the directed edges having a weight representing a measure of data transfer from an upstream task represented by the respective source vertex to a downstream task represented by the respective destination vertex;

wherein, based on the task graph, the task scheduler is further configured to schedule tasks from the task-set metadata among a plurality of accelerators, including the accelerator, to minimize a makespan;

wherein the first circuitry is configured to dispatch a first task, among the scheduled tasks, to the second circuitry based on output from the task scheduler;

wherein the sub-task scheduler is configured to schedule a plurality of sub-tasks of the first task for execution at the accelerator, the sub-tasks organized as two or more streams including: a first stream comprising computation sub-tasks each requiring one tile of the local memory storage; and a second stream comprising data-transfer sub-tasks;

wherein the computation sub-tasks are scheduled to execute synchronously and in parallel with the data-transfer sub-tasks at the accelerator, each of the computation sub-tasks executing in a respective first time slot and having input or output data transferred by a respective one of the data-transfer sub-tasks in a second time slot adjacent to the first time slot; and wherein the sub-task scheduler enables the first task to be executed at the accelerator with the given amount of the local memory storage being less than or equal to two tiles of the local memory storage.

15. The chipset of claim 14, wherein the processor core is a second processor core; the first circuitry comprises a first processor core and hard-wired circuitry implementing the task scheduler; and the first processor core is coupled to the hard-wired circuitry and configured to control the task scheduler.

16. The chipset of claim 14, wherein the second circuitry comprises hard-wired circuitry implementing the sub-task scheduler; and the processor core is coupled to the hard-wired circuitry and configured to control the sub-task scheduler.

17. The chipset of claim 14, wherein the processor core is configured to implement the sub-task scheduler by executing program instructions.

18. The chipset of claim 14, wherein the processor core is a first processor core, the accelerator is a first accelerator, the sub-task scheduler is a first sub-task scheduler, and further comprising:

third circuitry, coupled to the first circuitry, implementing a second accelerator and a second processor core, wherein the second processor core is configured to implement a second sub-task scheduler;

wherein the first circuitry is configured to dispatch a second task to the third circuitry based on the output from the task scheduler; and wherein the second sub-task scheduler is configured to schedule a plurality of sub-tasks of the second task at the second accelerator.

19. The chipset of claim 18, further comprising:

eight additional circuitries, each coupled to the first circuitry, each implementing a respective additional accelerator and a respective additional processor core configured to implement a respective additional sub-task scheduler;

wherein the first circuitry is configured to dispatch respective tasks to the additional circuitries based on the output from the task scheduler; and wherein each of the additional sub-task schedulers is configured to schedule a plurality of sub-tasks of the respective task at the respective additional accelerator.

20. The chipset of claim 14, wherein the accelerator implements a neural network kernel, a convolution function, a matrix arithmetic function, a matrix analysis function, a data compression function, an encryption function, a domain transform, a bit blit function, a regular expression search function, a wireless coding function, or a beamforming function.

21. The chipset of claim 14, wherein the processor core is a RISC-V processor core.

22. A smartphone comprising the chipset of claim 14, wherein the smartphone supports a 5G cellular network standard or a 6G cellular network standard.

23. A multimedia streaming apparatus comprising the chipset of claim 14, wherein the accelerator is configured to support high-efficiency video coding (HEVC).

24. A media streaming apparatus comprising the chipset of claim 14, wherein the accelerator is configured to support MP3 coding.

25. A telephony apparatus comprising the chipset of claim 14, wherein the accelerator is configured to support a voice coding standard.

26. A computer-implemented method comprising:

for the chipset of claim 16:
producing a first computer-readable description of the first circuitry implementing the task scheduler; and
producing a second computer-readable description of the second circuitry; and storing the first and second computer-readable descriptions in one or more computer-readable storage media, the first and second computer-readable descriptions being usable for fabricating one or more masks or reticles for manufacturing one or more integrated circuits implementing the first circuitry and the second circuitry.

27. The computer-implemented method of claim 26 further comprising:

fabricating the one or more masks or reticles using the stored first computer-readable description and the stored second computer-readable description.

28. The computer-implemented method of claim 26 further comprising:

manufacturing the one or more integrated circuits using the stored first computer-readable description and the stored second computer-readable description.

* * * * *